US008553984B2

(12) United States Patent
Slotine et al.

(10) Patent No.: US 8,553,984 B2
(45) Date of Patent: Oct. 8, 2013

(54) FAST PATTERN CLASSIFICATION BASED ON A SPARSE TRANSFORM

(75) Inventors: Jean-Jacques Emile Slotine, Boston, MA (US); Guoshen Yu, Palaiseau Cedex (FR)

(73) Assignee: Massachusetts Institute of Technology, Cambridge, MA (US)

( * ) Notice: Subject to any disclaimer, the term of this patent is extended or adjusted under 35 U.S.C. 154(b) by 979 days.

(21) Appl. No.: 12/433,675

(22) Filed: Apr. 30, 2009

(65) Prior Publication Data

US 2009/0297048 A1      Dec. 3, 2009

Related U.S. Application Data

(60) Provisional application No. 61/058,168, filed on Jun. 2, 2008.

(51) Int. Cl.
*G06K 9/00*      (2006.01)

(52) U.S. Cl.
USPC ............ 382/192; 382/103; 382/118; 382/131

(58) Field of Classification Search
USPC .................. 382/103, 118, 131, 190, 252, 299
See application file for complete search history.

(56) References Cited

U.S. PATENT DOCUMENTS

| | | | |
|---|---|---|---|
| 5,502,688 A | 3/1996 | Recchione et al. | |
| 5,870,493 A * | 2/1999 | Vogl et al. | 382/195 |
| 6,301,370 B1 * | 10/2001 | Steffens et al. | 382/103 |
| 7,006,703 B2 | 2/2006 | Venkatesan et al. | |
| 7,194,114 B2 | 3/2007 | Schneiderman | |
| 7,343,028 B2 * | 3/2008 | Ioffe et al. | 382/118 |
| 7,382,897 B2 * | 6/2008 | Brown et al. | 382/103 |

(Continued)

OTHER PUBLICATIONS

International Search Report and Written Opinion for PCT/US2009/042395, dated Apr. 30, 2009, pp. 1-12.

(Continued)

*Primary Examiner* — Vu Le
*Assistant Examiner* — Aklilu Woldemariam
(74) *Attorney, Agent, or Firm* — Evans & Molinelli PLLC; Eugene J. Molinelli

(57) ABSTRACT

Techniques for determining a feature in an image or soundtrack of one or more dimensions include receiving a subject image. A sparse transformed subject image is determined, which represents the subject image with a few significant coefficients compared to a number of values in the subject image. Multiple patch functions are received, which are based on a portion of a sparse transformed image for each of a training set of images and which represent learned features in the training set. A feature is determined to be in the subject image based on the transformed subject image and the plurality of patch functions. In various embodiments, a wavelet transformation or audio spectrogram is performed to produce the sparse transformed images. In some embodiments, the feature in the subject is determined regardless of feature location or size or orientation in the subject image.

23 Claims, 17 Drawing Sheets

(56) References Cited

U.S. PATENT DOCUMENTS

| | | |
|---|---|---|
| 7,596,247 B2 * | 9/2009 | Ioffe .................... 382/118 |
| 7,864,990 B2 * | 1/2011 | Corcoran et al. ........... 382/118 |
| 8,050,503 B2 * | 11/2011 | Dekel et al. ............... 382/209 |
| 8,111,873 B2 * | 2/2012 | Berthilsson et al. ......... 382/103 |
| 2004/0218834 A1 | 11/2004 | Bishop et al. |
| 2004/0243356 A1 * | 12/2004 | Duffy et al. .............. 702/189 |
| 2005/0169529 A1 | 8/2005 | Owechko et al. |
| 2005/0238198 A1 * | 10/2005 | Brown et al. ............. 382/103 |
| 2006/0067585 A1 * | 3/2006 | Pace ...................... 382/243 |
| 2006/0088189 A1 | 4/2006 | Szeliski et al. |
| 2006/0215880 A1 * | 9/2006 | Berthilsson et al. ........ 382/103 |
| 2009/0060340 A1 * | 3/2009 | Zhou .................... 382/190 |

OTHER PUBLICATIONS

Serre et al., "Robust Object Recognition with Cortex-Like Mechanisms", Jan. 15, 2007, IEEE Transactions on Pattern Analysis and Machine Intelligence, vol. 29, No. 3, Mar. 2007. Retrieved from the Internet: <URL: http://web.mit.edu/serre/www/publications/Serre_etal_PAMI07.pdf>.

* cited by examiner

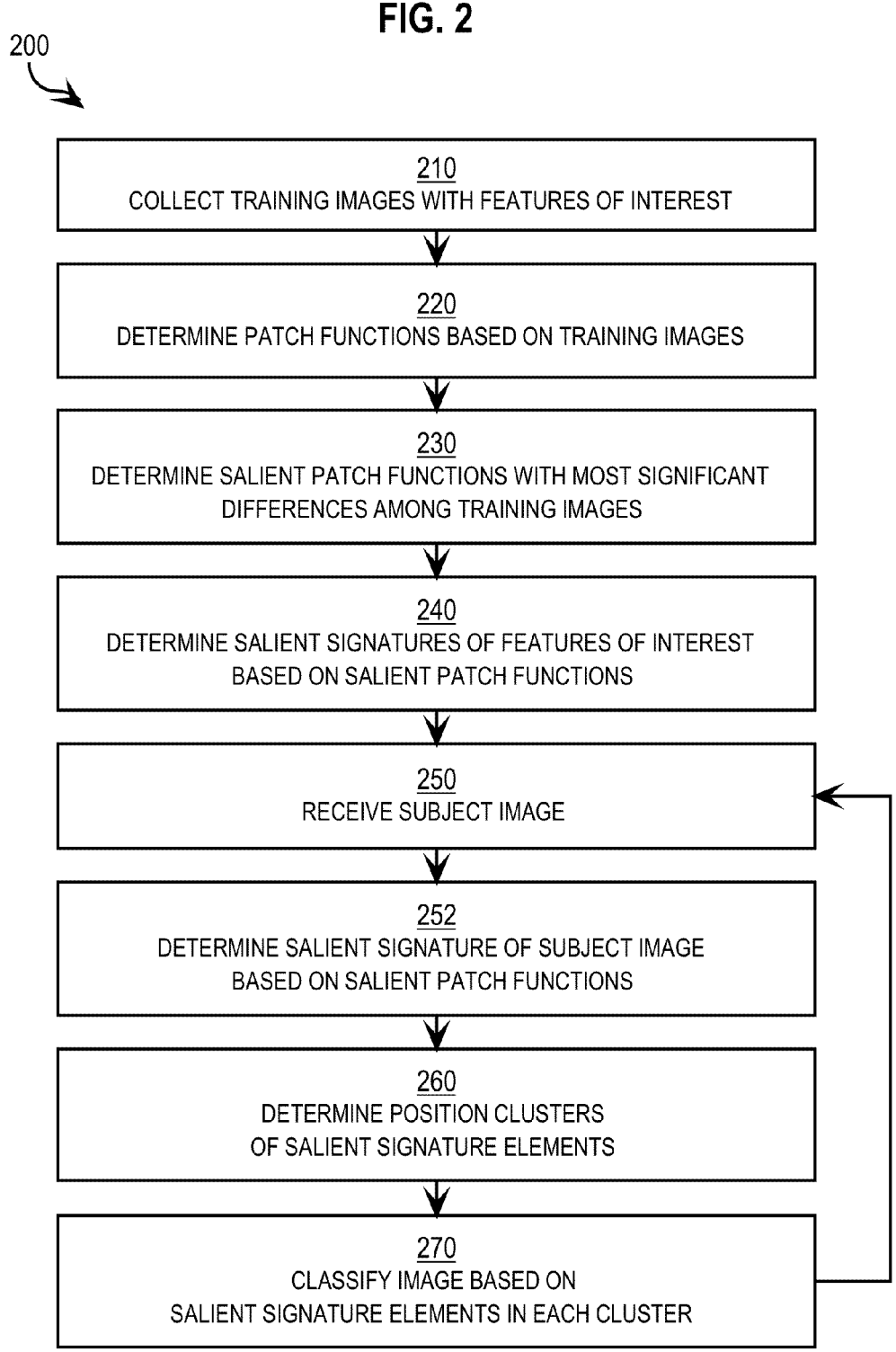

FIG. 6A
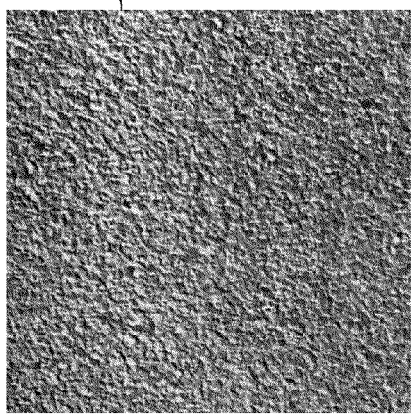
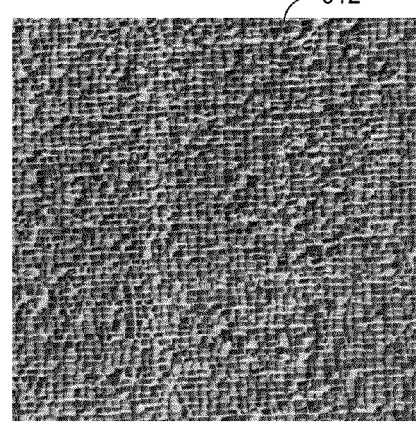
FIG. 6B
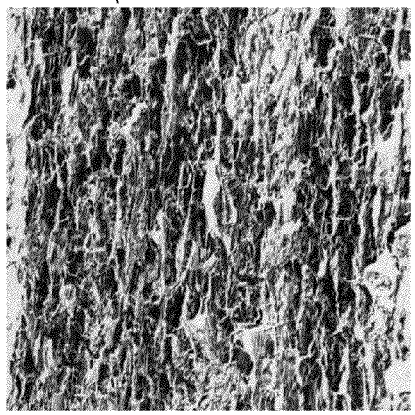
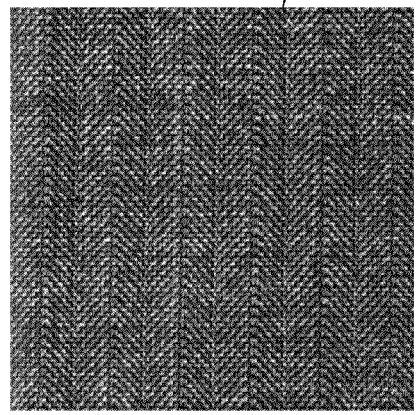
FIG. 6C
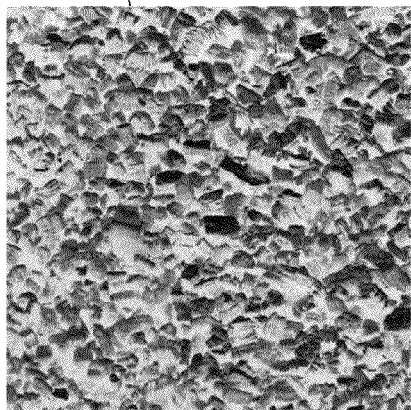
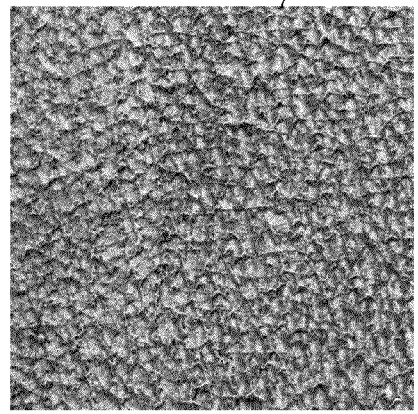

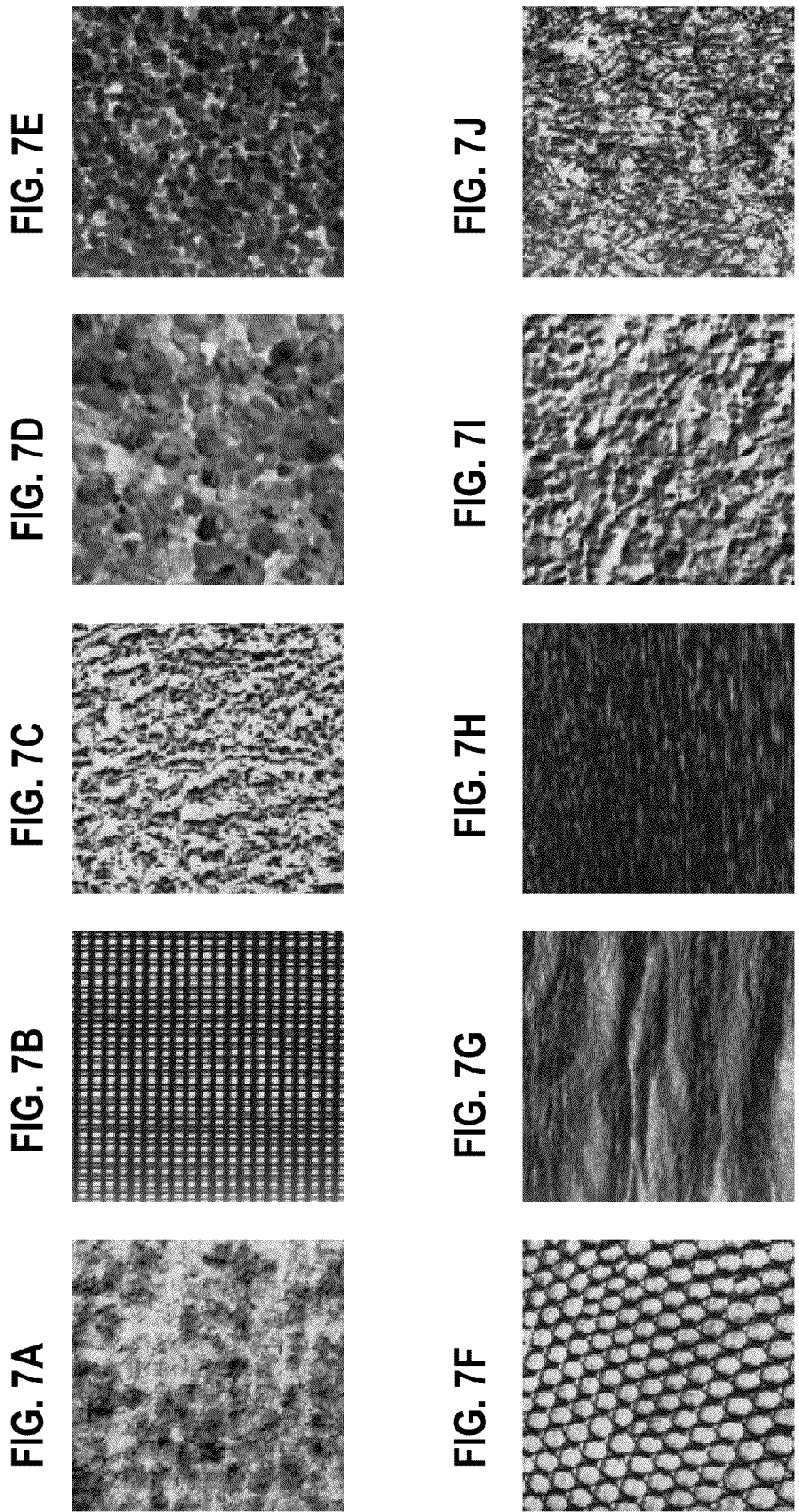

The mission of MIT is
serve the nation and th
to working with others
education that combine
campus community. W
effectively for the bett
charter. The opening n
a new kind of independ
practicable. He believe

FAST PATTERN CLASSIFICATION BASED ON A SPARSE TRANSFORM

CROSS-REFERENCE TO RELATED APPLICATIONS

This application claims benefit of Provisional Appln. 61/058,168, filed Jun. 2, 2008 under 35 U.S.C. §119(e).

BACKGROUND OF THE INVENTION

1. Field of the Invention

The present invention relates to feature and pattern recognition in images and image classification.

2. Description of the Related Art

The automated determination of features in an image has myriad applications, from sorting and searching images at a website or database to monitoring security cameras and sending alarms. However, many current approaches are unreliable or computer intensive and cumbersome using available computational hardware.

A recent approach has obtained significant improvement in object categorization accuracy using a feed-forward, hierarchical architecture closely modeled on the human visual system (see, for example, T. Serre, T., Wolf, S. Bileschi, M. Riesenhuber and T. Poggio, "Robust Object Recognition with Cortex-Like Mechanisms," *IEEE Trans. PAMI*, 29 (3) pp. 411-426, 2007, hereinafter Serre). However this approach suffers by requiring input of numerous ad-hoc parameters, marginally faster speeds, dependence on the size of objects relative to training sets, and degradation when multiple objects occupy the same image.

SUMMARY OF THE INVENTION

Techniques are provided for determining a pattern or other feature in an image of one or more dimensions, such as for recognizing particular objects or textures in such images or classifying such images based on the objects recognized.

In one set of embodiments, a method includes receiving a subject image. A sparse transformed subject image is determined, which represents the subject image with a few significant coefficients compared to a number of values in the subject image. Multiple patch functions are received, which are based on a portion of a sparse transformed image for each of a training set of images, and which represent learned features in the training set. A feature is determined to be in the subject image based on the transformed subject image and the patch functions.

In other embodiments, an apparatus is configured to perform, or a computer-readable storage medium holds instructions that cause a processor to perform, one or more steps of the above method.

In some embodiments, the feature is determined to be in the subject image regardless of feature location or size or orientation in the subject image.

In some embodiments, the sparse transformed subject image is determined by determining a log-spectrogram of image data representing a soundtrack.

In some embodiments, the sparse transformed subject image is determined by performing a wavelet transformation of the subject image to produce a plurality of transformed subject images wherein each transformed image of the plurality of transformed images represents wavelet coefficients for a different combination of scale and orientation.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates at a high level a method for classifying an image based on patterns recognized therein, according to an embodiment;

FIG. 6A, FIG. 6B and FIG. 6C are pairs of images that illustrates a first, second and third binary texture classification training set, respectively, according to an embodiment;

FIG. 7A, FIG. 7B, FIG. 7C, FIG. 7D, FIG. 7E, FIG. 7F, FIG. 7G, FIG. 7H, FIG. 7I and FIG. 7J are images that illustrate a texture classification training set for ten textures, according to an embodiment;

FIG. 10A, FIG. 10B, FIG. 10C, FIG. 10D, FIG. 10E and FIG. 10F are images that illustrate a portion of a language classification training set for six languages, according to an embodiment;

DETAILED DESCRIPTION

Figure 1:
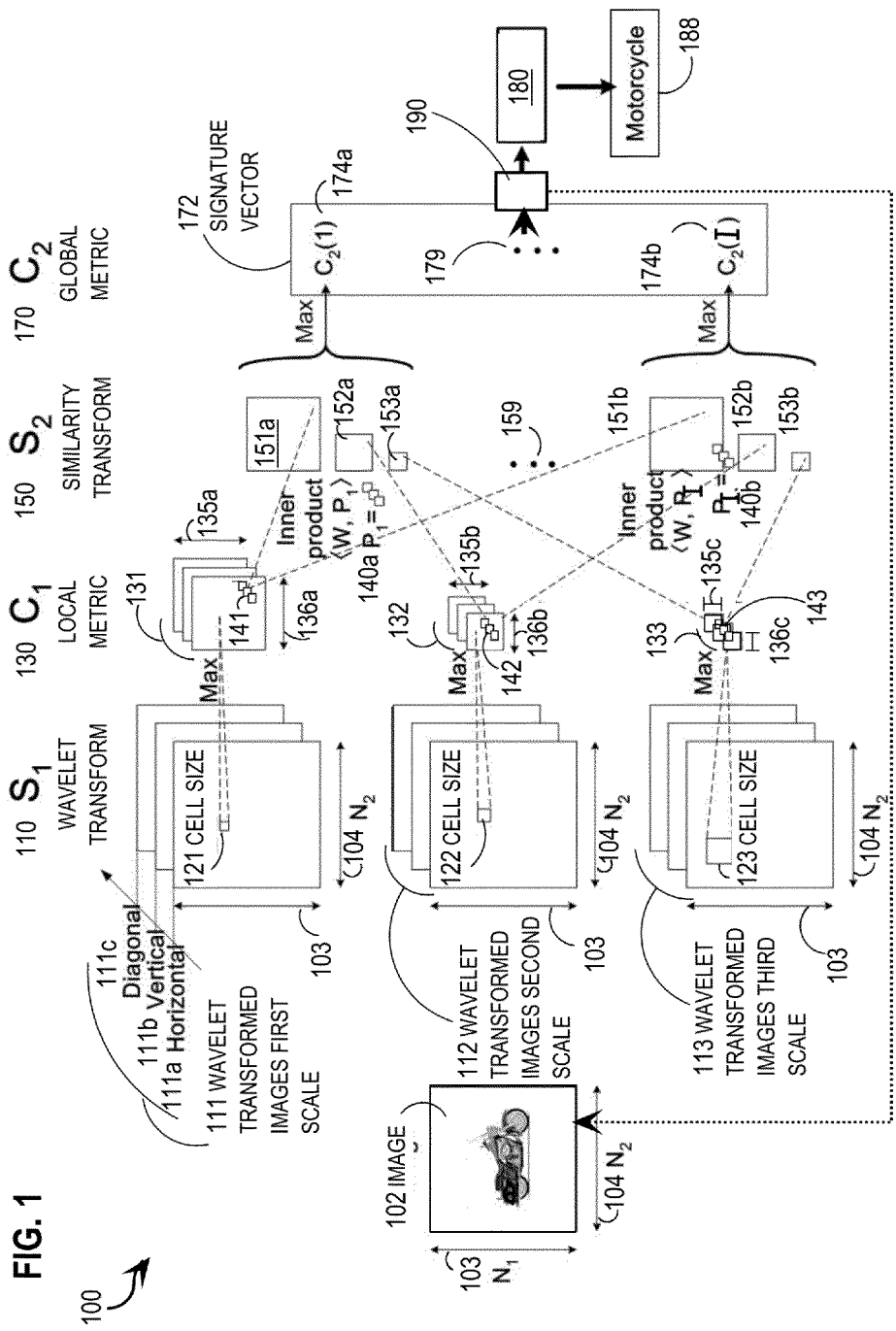
FIG. 1 is a block diagram that illustrates a hierarchical image processing system that includes wavelet transforms, according to an embodiment.

Techniques are described for pattern recognition or image classification or both. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of two dimensional images and processing analogous to that in the human visual cortex to recognize features easily recognized by a human. However, the invention is not limited to this context. In other embodiments the images have more or fewer dimensions, or the analogy with the visual cortex is weakened or absent. The term image is used herein to represent any data set with one or more dimensions. The terms feature and pattern are used interchangeably.

For example in some embodiments, the image is one dimensional, such as soundtrack data. In some embodiments the image is a three-dimensional data set, such as video data (images at multiples times), or a scanned volume comprising multiple scans of a two-dimensional scanning system, such as produced by Magnetic Resonance Imaging (MRI) systems and computer tomography (CT) X-ray imaging systems.

In some embodiments, the two dimensional images are not visual. For example, in some embodiments the images are time-frequency plots of acoustic data. In some such embodiments the features to recognize are particular instruments, such as a flute or violin. In some embodiments the features are not those recognized by a human observer. For example, in various other embodiments the features are speckles of colored light emitted by fluorescent arrays in the presence of certain target molecules, such as for drug research, or subtle features that distinguish normal from abnormal scans of living or inanimate subjects.

In still other embodiments, extensions of the algorithm plausibly account for action recognition as well, motivated by the organizational similarity of the ventral and dorsal pathways of the visual system. Such embodiments have applications in motion capture for computer graphics, and in lip reading and gesture recognition. In robotics, other embodiments are used as a component of imitation learning and multi-robot coordination. Applications of still other embodiments include medical imaging and high-throughput drug development. In various embodiments, the classification indicates semantic content of photographic or video archives, texture retrieval for commercial or forensic matching of materials' surfaces, and video surveillance.

1. Overview

The illustrated embodiment is a biologically motivated approach to fast visual classification, building on the recent work of Serre; but specifically, trading-off biological accuracy for computational efficiency. Several resulting embodiments use wavelet transforms and grouplet-like transforms to parallel the tuning of visual cortex V1 and V2 cells and to achieve scale and translation invariance. These transforms are alternated with operations to find a maximum value. In some embodiments, a learned feature selection procedure is applied during learning to accelerate recognition. In addition, in some embodiments, an attention-like feedback mechanism is introduced, significantly improving recognition and robustness in multiple-object scenes. In some embodiments, an enhanced forward classification mechanism with reduced signature vectors is introduced to handle multiple features in a single image. In experiments, the illustrated embodiment achieves or exceeds state-of-the-art success rate on object recognition, texture and satellite image classification, and language identification, for single feature and multiple feature images.

It is recognized that the wavelet transform is adept at responding to features of interest, and produces a relatively sparse output matrix for certain kinds of input imagery. It is advantageous to transform the input images to a good representation in which some salient features of the signals are well represented. Normally such good representations should be "sparse", which means that most coefficients in the representation are almost zero. We call such transforms "sparse transforms" herein. With sparse transforms, the few big coefficients are more likely to contain the salient features. Other transforms that produce sparse representations may be used in lieu of wavelet transforms in some embodiments. For example, a time frequency image (spectrogram) produced by a short time Fourier transform (STFT) on sequential intervals of audio data is shown to be useful in place of a wavelet transform to identify musical instruments in soundtrack data.

FIG. 1 is a block diagram that illustrates a hierarchical image processing system 100 that includes wavelet transforms, according to an embodiment. The process 100 operates on image 102 that has values for each of $N_1$ rows 103 and $N_2$ columns 104. In the first layer of the hierarchy, a wavelet transform 110 is performed to produce transformed images designated $S_1$. In a second layer, a local metric finding operation 130 is performed to produce local metric matrices designated $C_1$. In a third layer, a grouplet-like similarity transform 150 is performed to produce similarity matrices designated $S_2$. In a fourth layer, a global metric finding operation 170 is performed to produce vector elements designated $C_2$ of a signature vector 172. A classifier 180 compares the signature vector of a subject image to the signatures vectors of multiple training images with features of interest to determine whether any of those features of interest are in the subject image. A signature vector process 190 is included in some embodiments to crop the image for a feedback process or reduce the signature vector to speed classification in multiple object images. In some embodiments the subject image is classified based on the features in or absent from the subject image. In various embodiments, the features of interest include textures, particular spatial patterns, and types of particular objects such as motorcycles and airplanes.

As described in more detail below, with reference to FIG. 2, the wavelet transform 110 produces a transformed image $S_1$ for each of several orientations and scales. For two dimensional images, there are three wavelet orientations of transformed images (see for example, S. Mallat, *A Wavelet Tour of Signal Processing*, Academic Press, 2 nd edition, 1999, hereinafter, Mallet I, the entire contents of which are hereby incorporated by reference as if fully set forth herein, except where in conflict with express statements made herein). The frequency and orientation tuning of cells in visual cortex V1 are interpreted as performing a wavelet transform of the retinal image.

In the illustrated embodiment, translation-invariant wavelet transforms are performed at each of three orientations (e.g., horizontal, vertical and diagonal) for each of three scales. This is desirable because the objects are to be recognized wherever they occur in the image. In other embodiments, where position matters, the wavelet transformations are not translation-invariant. For example, in some embodiments, wavelet transformations of time-frequency data from sound recordings are not translation-invariant transformations in the frequency dimension. The result of transformation 110 is three transformed images 111 at a first scale, including horizontal wavelet transformed image 111a at the first scale, vertical wavelet transformed image 111b at the first scale and diagonal wavelet transformed image 111c at the first scale. Similarly, the transformed images $S_1$ include three transformed images 112 at a second scale, and three transformed images 113 at a third scale. Each of these transformed images $S_1$ has $N_1$ rows 103 and $N_2$ columns 104.

In the second layer, a local metric operation 130 is performed. The local metric is determined for each cell of a matrix of cells spanning the transformed images $S_1$. The size of the cell is proportional to the scale of the wavelet transform; the transformed images based on the finer wavelet scales have the smaller cell sizes. Thus the wavelet transformed images 111 at the finest wavelet scale use the smallest cell size, as indicated by the cell size 121. Similarly, the wavelet transformed images 112 at the next larger scale use the next larger cell size 122; and the wavelet transformed images 113 at the largest scale use the largest cell size 123. In the illustrated embodiment, non-overlapping cells span the entire transformed image and produce a matrix $C_1$ of cell values, each value equal to the metric of the transformed image values within the cell. In an illustrated embodiment, the metric for the cell is a maximum value. In other embodiments other metrics are used, such as the mean value, a median value, a particular percentile value, or a minimum value, or some combination. In various other embodiments the cells are overlapping or do not span the entire transformed image, or both. Three matrices of cell values are produced at each scale, one each from the three transformed images at the three orientations—local metric matrices 131 from transformed images 111, local metric matrices 132 from transformed images 112, and local metric matrices 133 from transformed images 113.

The number of elements in the local metric matrices is inversely proportional to the cell sizes. For example, a cell size 121 of 2×2 transformed image values produces local metric matrices 131 that each has a number of rows 135a equal to $N_1/2$ and a number of columns 136a equal to $N_2/2$. Similarly, a cell size 122 of 4×4 transformed image values produces local metric matrices 132 that each have a number of rows 135b equal to $N_1/4$ and a number of columns 136b equal to $N_2/4$; and, a cell size 123 of 8×8 transformed image values produces local metric matrices 133 that each have a number of rows 135c equal to $N_1/8$ and a number of columns 136c equal to $N_2/8$, as depicted in FIG. 1.

In the third layer a similarity transform 150 is performed. Cells in visual cortex V2 and V4 have larger receptive fields comparing to those in V1; and are tuned to geometrically more complex stimuli such as contours and corners. The inventors recognized that the geometrical grouplets recently proposed by S. Mallat, "Geometrical Grouplets", ACHA, to appear, 2008 (hereinafter Mallet II) imitate this mechanism by grouping and retransforming the wavelet coefficients. The procedure in similarity transform 150 is analogous to the grouplet transform. However, instead of grouping the wavelet coefficients with a multi-scale geometrically adaptive association field and then re-transforming them with Haar-like functions as in Mallet II, the inventors decided to calculate a measure of similarity between $C_1$ values in the local metric matrices and sliding patch functions of different sizes. The patch functions are determined by a random sampling of portions of the local metric matrices of a set of training images, as described in more detail below. For example, in an illustrated embodiment, the measure of similarity is an inner product (also called a dot product) that is the sum of the products of the values at corresponding positions in the two matrices (local metric matrices and a patch function); and the two matrices are more similar if the value of the metric is larger. In other embodiments another scalar metric of similarity is used, such as the sum of the differences (or differences squared or absolute value of the differences or the maximum of the absolute values of the differences) and the matrices are more similar if the similarity metric is smaller. Thus the similarity transform 150 determines similarity to a set of learned features.

Each patch function is a small matrix of values sampled from corresponding locations in the local metric matrices of one training image at three orientations. During the transform 150, a sliding window of the same size as the patch function (in each of the orientations) is used to select the matrix of cell values to form the similarity metric with the patch functions. The resulting scalar value is placed in an output matrix at the same location as the sliding window. Thus there is one scalar value for each position in one local metric matrix that combines the information in all orientations.

This process is illustrated in FIG. 1, which shows the sliding window 141 in all three orientations that is the same size as a first patch function, $P_1$, 140a. The resulting scalar value for the similarity of the window 141 with $P_1$ 140a is placed in the similarity matrix 151a. Another sliding window in all three orientations (not shown) is the same size as a last patch function, $P_1$, 140b. The resulting scalar value for the similarity of the window with $P_1$ 140b is placed in the similarity matrix 151b. Likewise, a resulting scalar value for the similarity of the window 142 with $P_1$ 140a is placed in the similarity matrix 152a; and a resulting scalar value for the similarity of a window with $P_1$ 140b is placed in the similarity matrix 152b. Likewise, a resulting scalar value for the similarity of the window 143 with $P_1$ 140a is placed in the similarity matrix 153a; and a resulting scalar value for the similarity of a window with $P_1$ 140b is placed in the similarity matrix 153b. Ellipsis 159 represents the three similarity matrices for patch functions $P_2$ through $P_{I-1}$, (not shown).

In the fourth layer a global metric operation 170 is performed. The global metric value designated $C_2$ is determined over all the similarity values $S_2$ formed by one patch function. Any metric may be used. In the illustrated embodiment, the metric is a global maximum value over all the similarity values S2 formed by one patch function. Thus the maximum scalar value in the three matrices 151a, 152a, 153a is selected as the value of $C_2$ for the first patch function, designated $C_2(1)$. Similarly, the maximum scalar value in the three matrices 151b, 152b, 153b is selected as the value of $C_2$ for the last patch function, designated $C_2(I)$. The maximum value $C_2$ for the remaining patch functions are indicated in FIG. 1 by ellipsis 179. The vector of $C_2$ values for all patch functions is called the signature vector 172 of the original image 102.

It is noted here that the selected metric value for $C_2$ comes from one of the similarity values $S_2$ that is associated with a position of a cell in one or more of the transformed images $S_1$ and thus a corresponding location in the original image 102. That position represents the location in the original image 102 where the particular patch function has the greatest similarity value and hence is most correlated. The position, however, is not included in the signature vector 172.

In signature vector process 190, the signature vector is processed to achieve further advantages. For example, in some embodiments, a cluster analysis is performed on the locations in the images associated with each signature vector element. In some embodiments, this cluster is used to divide the original image 102, and the process 100 is repeated on one of the divided portions (called a cropped image) in a feedback mechanism. In some embodiments, this cluster is used to divide the signature vector into different sets of elements, and the reduced number of signature vector elements from one set at a time, called herein a reduced signature vector, is sent to the classifiers to classify the image. The signature vector process 190 is useful for an image that includes multiple features from the training set. The process 190 focuses attention on one feature at a time in images with multiple features. In some embodiments, process 190 is omitted.

In classifier 180, the original or reduced signature vector 172 of an original or cropped subject image is compared to the original or reduced signature vectors 172 of one or more training images in order to recognize features in the subject image or classify the subject image based on the features present or absent in the subject image. The classifier output is 188. Any classifier may be used. In an example embodiment, described in more detail below, a nearest neighbor classifier is used, e.g., the subject image with a particular signature vector 172 (or reduced signature vector) is given the same classification as the training image with a signature vector 172 (or reduced signature vector) closest to the particular signature vector (or reduced signature vector) using any vector distance function known in the art. In the embodiment illustrated in FIG. 1, the subject image 102 is classified by classifier 180 as a motorcycle image, indicated by contents of output 188.

2. Method for Image Classification

FIG. 2 is a flow diagram that illustrates at a high level a method 200 for classifying an image based on features recognized therein, according to an embodiment. Although a particular number of steps are shown in a particular order for purposes of illustration, in other embodiments one or more steps are performed in a different order or overlapping in time, in series or in parallel, or one or more steps are omitted or other steps are added or the process is changed in some combination of ways.

In step 210, training images with features of interest are collected and received. Recall that, as used herein, images include data sets with one or more dimensions. However, in the preferred embodiments, all training images and subject images to be classified have the same number of dimensions. In the illustrated embodiment the training images and subject images have two dimensions. Step 210 includes any preprocessing of the training images to make them comparable and suitable for feature recognition.

Any method may be used to receive this image data. For example, in various embodiments, the image data is included as a default value in software instructions, is received as manual input from a network administrator on the local or a remote node, is retrieved from a local file or database, is sent from a different node on the network, either in response to a query or unsolicited, is sent directly or indirectly from a measuring device, or the data is received using some combination of these methods.

Figure 3A:
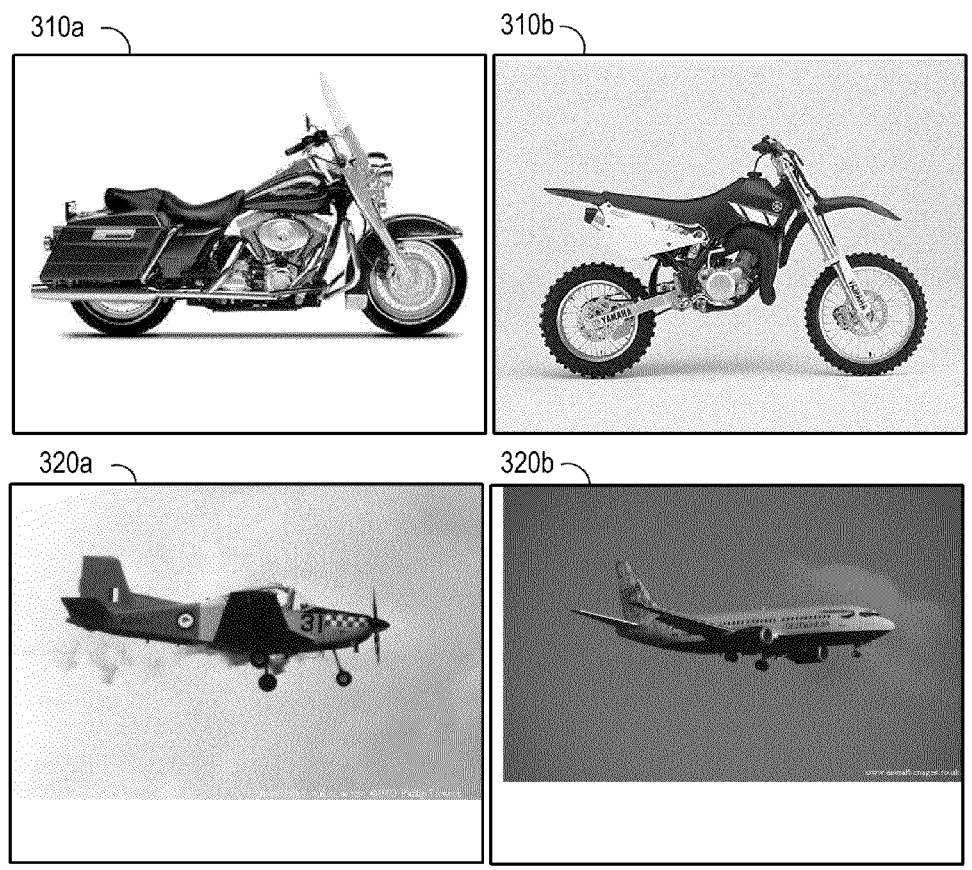
FIG. 3A and FIG. 3B are a collection of sample images that illustrate a portion of a training set, according to an embodiment.
Figure 3B:
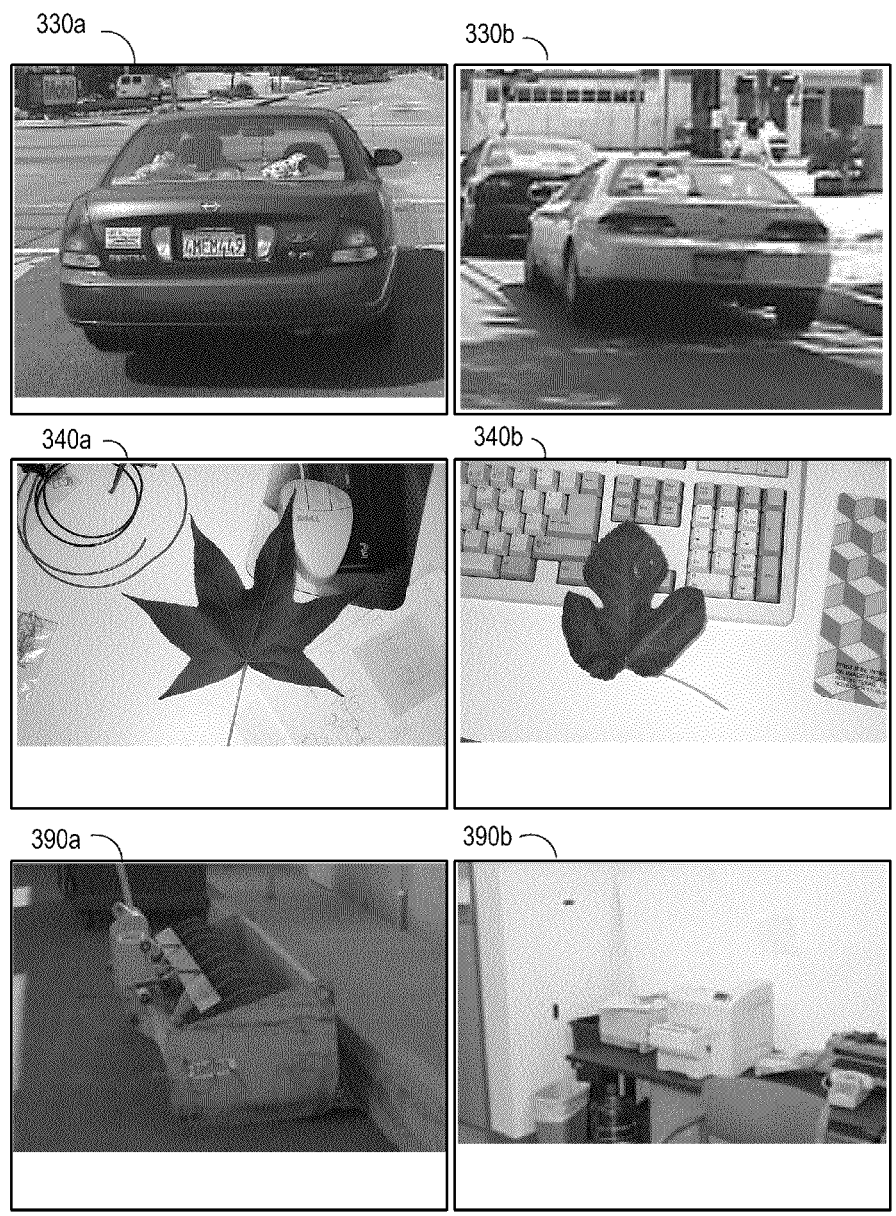

FIG. 3A and FIG. 3B are a collection of sample images that illustrate a portion of a training set, according to an embodiment. The training set of this embodiment includes image 310a and image 310b, among others (not shown), associated with the feature "motorcycle"; image 320a and image 310b, among others (not shown), associated with the feature "airplane"; image 330a and image 330b, among others (not shown), associated with the feature "car rear"; image 340a and image 340b, among others (not shown), associated with the feature "leaf"; and, image 390a and image 390b, among others (not shown), associated with the feature "background". The preprocessing steps on these images during experiments are described in more detail in a later section.

In step 220, patch functions are determined based on the training images. The patch functions are determined by random sampling of the local metric matrices $C_1$. Thus step 220 includes performing the wavelet transform 110 and the local metric operation 130 depicted in FIG. 1.

2.1 Wavelet Transformation

A translation-invariant wavelet transformation is expressed by Equation 1.

$$Wf(u,v)_{j,k} = \sum_{x=1,N_1}\sum_{y=1,N_2} f(x,y)*2^{-j}*\psi_k\left(\frac{\{x-u\}}{2^j}\cdot\frac{\{y-v\}}{2^j}\right) \quad (1)$$

where f(x,y) is a grayscale image of size $N_1 \times N_2$ (e.g., image 102) in which x is the horizontal coordinate as given by the row number and y is the vertical coordinate given by the column number; and, $\psi_k$ is a wavelet function at orientation k (for one dimensional images k=1, for two dimensional images k=1,3 and for three dimensional images, k=1,8), as is well known in the art. The three orientations in two dimensions are designated horizontal, vertical and diagonal, respectively. The scale is an integral power of 2 indicated by the exponent j. For each value of k and j, there is an array of values for the transformed image, called wavelet coefficients, Wf, at positions u, v that represent displacements from coordinates x and y, respectively.

Scale invariance is achieved by a normalization expressed by Equation 2.

$$S_1(u,v)_{j,k} = |Wf(u,v)_{j,k}|/\|f\|^2_{support} \quad (2)$$

where the denominator is the image energy within the support of the wavelet function $\psi_k$, where, by definition, the wavelet function has non-zero values. One can verify that $$S_1(u,v)_{j,k} = S_1'(2^\beta u, 2^\beta v)_{\beta j,k} \quad (3)$$

where $S_1$ and $S_1'$ are the transformed image of f(x,y) and its β-times zoomed version $f(x/2^\beta, y/2^\beta)$, respectively. This normalization also makes the recognition of features invariant to changes in global linear illumination. In some embodiments, scale is important, e.g., for tumor size in CT images, and scale invariance is not desirable; thus the normalization of Equation 2 is not performed in some embodiments.

For the wavelet transformation 110 illustrated in FIG. 1, k≠1,3 and j=1,3 so that there are nine arrays of $S_1(u,v)$, depicted as three transformed images 111, three transformed images 112 and three transformed images 113 for each image in the training set.

2.2 Local Metric Operation

Step 220 includes performing the local metric operation on the transformed images $S_1(u,v)_{j,k}$ for each of the training set images. For the illustrated embodiment, the metric is the maximum value in the cell and the local metric is a local maximum. A cell size is defined for each scale factor j as $2^j$ values in the horizontal dimension (u) and $2^j$ values in the vertical dimension (v). Thus the cell size is proportional to the scale factor j. The coordinates of the cell are the u,v coordinates of any particular value in the cell. In some embodiments, the cell coordinates are the same as the value at the center of the cell; in an illustrated embodiment the cell coordinates are the same as the first row and first column of values within the cell. Thus, the values throughout the cell are spanned by coordinates u' and v', and the local metric is given by Equation 4.

$$C_1(u,v)_{j,k} = \text{Metric over } u',v' \text{ of } S_1(u,v)_{j,k} \qquad (4)$$

where $u' \in [2^j(u-1)+1 \text{ to } 2^j u]$
and $v' \in [2^j(v-1)+1 \text{ to } 2^j v]$ The cells are non-overlapping in the illustrated embodiment, so the cell coordinates are also offset by $2^j$ in each direction. In other embodiments, the cells are overlapping. Each resulting $C_1$ matrix of local metric values at scale factor j is thus of size $N_1/2^j \times N_2/2^j$. In an illustrated embodiment, the three scale factors are j=1,3, so the resulting $C_1$ matrices are one half, one quarter and one eighth the linear dimensions of the original and transformed images, as shown in FIG. 1 matrices 131, matrices 132 and matrices 133, respectively.

2.3 Patch Functions for Similarity Transformation

Step 220 includes determining the patch functions by taking small samples at random the local metric matrices $C_1(u,v)_{j,k}$. The ith patch function size is a square of linear dimension $M_i$ that is small compared to the size of the $C_1$ matrices, but otherwise of random size, for each of the orientations. We here designate the local metric matrices of the ith randomly selected training image as $Ci_1$, the random scale as $ji$ and the random horizontal and vertical indices as $u_i$ and $v_i$, respectively, where $u_j$ and $v_j$ are less than or equal to $N_1/2^{ji}-M_i$ and $N_2/2^{ji}-M_i$, respectively. Thus the ith patch function $P_i$ is given by Equation 5.

$$P_i(u'',v'') = P_i(u'',v'',1) U P_i(u'',v'',2) U P_i(u'',v'',3) \qquad (5)$$

where $P_i(u'',v'',k) = Ci_1(u'',v'',1)_{ji\,k}$ for k=1,3
and $u'' \in [u_i \text{ to } u_i + M_i]$
and $v'' \in [v_i \text{ to } v_i + M_i]$ and U represents the union of sets. Thus each of the first and last patch functions ($P_1$ and $P_I$, respectively) is represented in FIG. 1 as three matrices, one for each orientation k. Any number I of patch functions may be defined to sample the training set.

2.4 Patch Functions Selection

Structures that appear with a high probability are likely to be learned as patch functions through the random sampling, described above. However, all such patch functions are not necessarily salient and neither are the resulting $C_2$ elements in the signature vector 172.

In step 230, the most salient patch functions are determined. Using only the most salient patch functions adds computational efficiency. In terms of biological analogs, such reorganization of patch functions might be related to a similar process thought to occur after immediate learning, notably during sleep, and by the relative uniformity of cortical anatomy which suggests enhancing computational similarity between the two layers. Also, sparse, selected patch functions have proved effective in an approach retaining one salient direction at each position (J. Mutch and D. Lowe, "Multiclass Object Recognition with Sparse, Localized Features", CVPR 06, pp. 11-18).

In the illustrated embodiment, the salient patch functions are the patch functions that show the most significant variation among the training set signature vector elements, $C_2$. In some embodiments, step 230 is omitted and all patch functions defined by the random sampling are used. Here we use I to indicate the number of patch functions used in subsequent steps, and $I_0$ to indicate the number of patch functions originally produced by the random sampling of the local metric matrices. When step 230 is omitted, $I = I_0$. When the most salient patch functions are determined and used, $I < I_0$.

To determine the patch functions with the most significant differences, the signature vector 172 is determined with all $I_0$ elements $C_2$ for all the images in the training set. A small $C_2(i)$ variation among the training set images implies that the corresponding patch function $P_i$ is not salient. In the illustrated embodiment, the variance of the ith $C_2$ element across the signature vectors of all the training images is determined. The $I_0$ $C_2$ elements are then sorted in order of decreasing variance; and the I patch functions associated with the $C_2$ elements that produce the greatest variance are selected as the salient patch functions. We here renumber those I patch functions as $P_i$, i=1,I.

In the illustrated embodiment, step 230 includes performing the similarity transform 150 and the global metric operation 170 for all the training images to produce the signature vector 172 for all the training vectors. Those operations are described in more detail in the following sections. Here is demonstrated the effects of selecting the most salient patch functions.

Figure 4A:
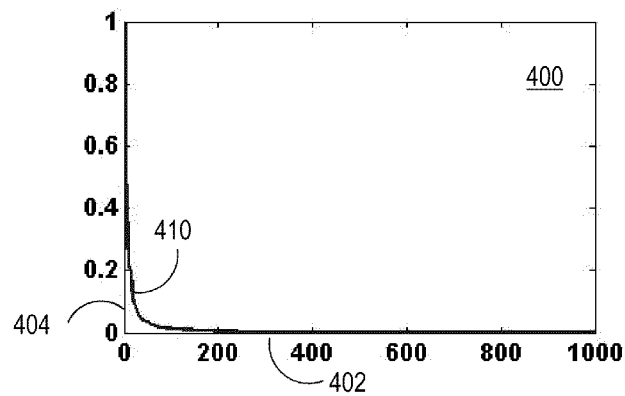
FIG. 4A is a graph that illustrates variance in signature vector elements for a training set of images, according to an embodiment.

FIG. 4A is a graph 400 that illustrates variance in signature vector elements for a training set of images, according to an embodiment. The vertical axis 404 is variance of the values of an element of the signature vector across all training images, in arbitrary units. The horizontal axis 402 is signature vector element index i corresponding to patch function index i (after sorting in order of decreasing variance). The curve 410 plots the variance of the $C_2$ coefficients of motorcycle and background training images taken from the Caltech5 database (some of which are shown in FIG. 3A and FIG. 3B, described above). At the time of this writing, this database can be found online in the file data3.html in the directory vgg at the domain robots.ox.ac.uk. The patch functions were learned from the same training images. Out of the $I_0$=1000 patches in this example embodiment, I=200 salient patch functions for which the associated C2 elements have non-negligible variance are selected. The non-salient patch functions usually correspond to unrelated structures, such as a common background, and are therefore excluded with little or no penalty in accuracy.

Figure 4B:
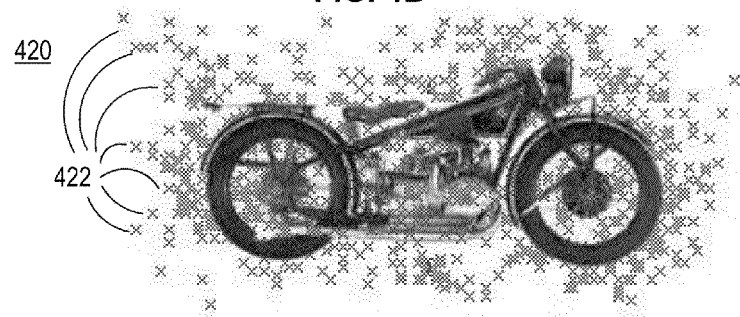
FIG. 4B is a plot of the locations of cells whose dot product is a maximum for each patch function, with the plot superimposed on an image of a motorcycle, according to an embodiment.
Figure 4C:
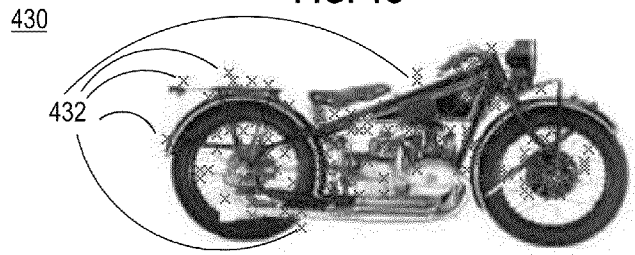
FIG. 4C is a plot of the locations of cells whose dot product is a maximum for each salient patch function, with the plot superimposed on an image of a motorcycle, according to an embodiment.

FIG. 4B is a plot 420 of the locations 422 of cells whose dot product is a global maximum for each patch function, i.e., the positions associated with the $C_2$ elements of the signature vector, with the plot superimposed on an image of a motorcycle, according to an embodiment. All 1000 patch functions and corresponding cell positions are plotted. FIG. 4C is a plot 430 of the locations 432 of cells whose dot product is a maximum for each salient patch function, i.e., the positions associated with the $C_2$ elements of the signature vector, with the plot superimposed on the same image of a motorcycle, according to an embodiment. After patch selection the locations 432 of cell positions associated with the 200 $C_2$ coefficients are mainly on the object. In contrast, the locations 422 of cells associated with the 1000 $C_2$ coefficients spread over all the image. Recognition using these I=200 salient patch functions is not only more robust, but also 5 times faster than using $I_0$=1000 patch functions.

In some embodiments, the number of salient patch functions is further reduced. The positions of the cells associated with each patch function are used with a clustering algorithm to define a particular number of clusters. One patch function is chosen in each cluster. For example, a patch function with an associated cell position closest to a center of mass of the cluster of cell positions associated with patch functions is taken as representative of the all the patch functions in the cluster. The number of salient patch functions can then be reduced, e.g., from I=200 patch functions based on variance to I=20 cluster representative patch functions, and still use-fully recognize features or classify images. The reduction in the number of patch functions speeds the processing of subject images, described below. The number of clusters can be determined so that the third layer processing, i.e., the similarity transform 150, proceeds as rapidly as the other layers of the hierarchy, and does not become a bottleneck in pipeline processing. In some embodiments, the clustering of patch functions is performed on the original set, e.g., I=1000 patch functions, without first determining the patch functions associated with the most variance.

2.5 Similarity Matrices

As described above, step 230 includes producing the similarity matrices $S_2$ during the similarity transformation 150. A similarity matrix $S_2$ is determined for each scale j and patch function i from the local metric matrices $C_1$. Any scalar measure of similarity may be used. In some embodiments, the scalar measure of similarity is a sum of differences (or differences squared) of the values in the local metric matrix and the corresponding positions in the patch function; and the local metric matrix is most similar to the patch function where the sum of differences is smallest. In an illustrated embodiment, the similarity matrix is a dot product of the values in the local metric matrix and the corresponding values in the patch function; and the local metric is most similar to the patch function when the dot product is greatest. For example, when the similarity matrix is a dot product, then a similarity matrix $S_2$ is determined for each scale j and patch function i from the local metric matrices $C_1$, as given by Equation 6.

$$S_2(u,v)_{j,i} = \sum_{u'=1,\frac{N_1}{2^j}} \sum_{v'=1,\frac{N_1}{2^j}} \sum_{k=1,3} C_1(u',v')_{jk} * P_i\begin{pmatrix} u'-u, \\ v'-v, k \end{pmatrix} \quad (6)$$

This represents a dot product of a sliding window of the $C_1$ matrix of size equal to the patch function, and the patch function, to give a scalar value $S_2$ at each position u,v corresponding to the cell positions in the local metric matrix, as shown in FIG. 1. The three orientations k in the illustrated embodiment at each scale j collapse to one similarity matrix per patch function $P_i$.

2.6 Global Metric Operation

As described above, step 230 includes producing the signature vector element $C_2(i)$ for each patch function $P_i$, and each training set image during the global metric operation 170. This operation is expressed by Equation 7.

$$C_2(i) = \text{Metric over } u,v,j \text{ of } S_2(u,v)_{j,i} \quad (7)$$

The resulting $C_2(i)$ are thus invariant to image translation and scale change. In the illustrated embodiment, the metric is a maximum value and the global metric is a global maximum for each patch function.

2.7 Salient Signatures of Training Images

In step 240 the salient signatures of training images are determined, one signature vector per training image. If step 230 is omitted, step 240 involves, for example, applying Equation 6 to produce the similarity matrices and Equation 7 to obtain the global metric for all $I_0$ patch functions for all training images in the training set.

However, if step 230 is included, then step 240 simply involves reducing the signature vectors already calculated during step 230 to the I<$I_0$ signature vector elements $C_2(i)$ that experience the greatest variance.

The signature vector for each training image in the training set is associated with the feature included in that training image and used by the classifier (e.g., classifier 180) to identify features in subject images that are not in the training set, or classify those images, or both.

2.8 Subject Image Processing

Steps 210 to 240, described above, are performed on a set of multiple training images that includes features of interest. These steps are performed once to determine the patch functions and the signature vectors for the training set used by the classifier 180. The following steps 250 to 270 are repeated for each subject image to be classified and do not require any further operation of steps 210 to 240.

In step 250, a subject image is received. Any method may be used to receive this data, as described above.

In step 252 the salient signature vector is determined for the subject image based on the I salient patch functions. In the illustrated embodiment, step 252 involves: 1] applying Equation 1 and Equation 2 to produce the wavelet transformed images $S_1$; 2] applying Equation 4 to produce local metric matrices $C_1$; 3] applying Equation 6 to produce the similarity matrices $S_2$; and 4] applying Equation 7 to obtain the global metric for I patch functions to produce a signature vector 172 with I elements $C_2$. If I salient patch functions (I<$I_0$) are not determined in step 230, then I=$I_0$ and Equation 7 produces a signature vector 172 with I=$I_0$ elements $C_2$. It is noted that Equation 5 to determine the patch functions need not be applied, since the patch functions are already defined during step 220.

2.9 Subject Image with Multiple Features

In step 260, position clusters are determined for the signature vector elements $C_2(i)$ of the subject image signature vector 172. In some embodiments, step 260 is omitted.

The inventors have discovered that when multiple features appear in a subject image, the positions of cells associated with the signature vector elements of the subject image often form multiple clusters. These clusters can be used to focus attention of the process 100 to better recognize features in the image and therefore to better classify the image.

Figure 5A:
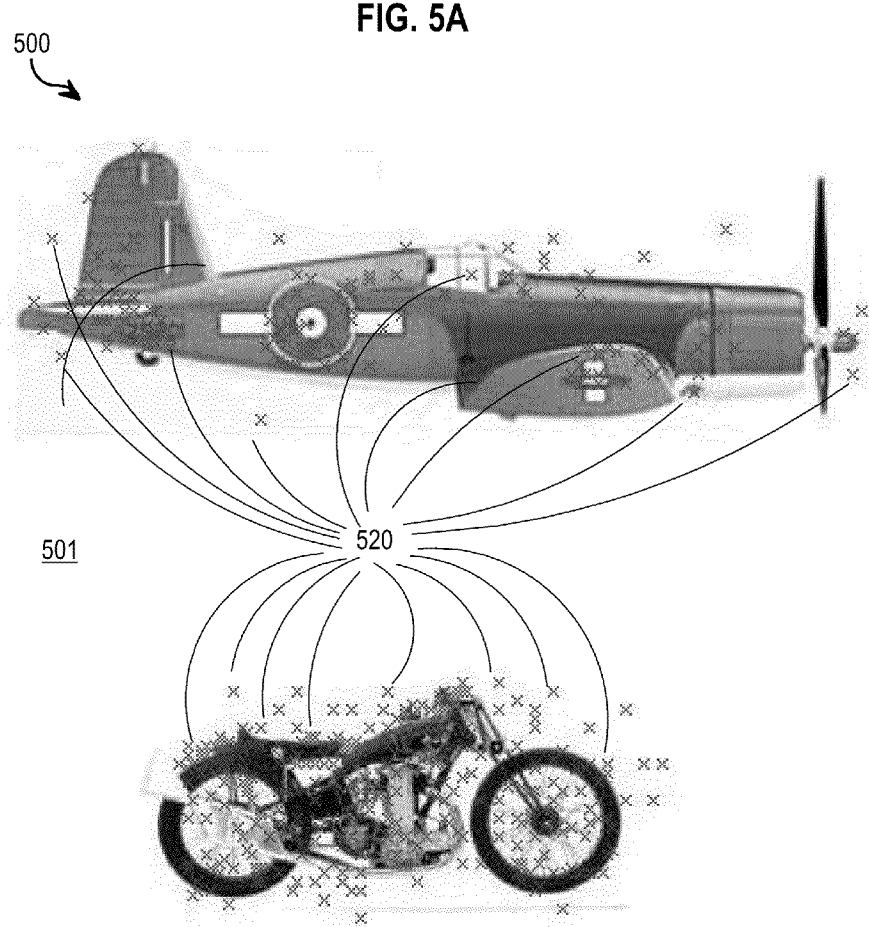
FIG. 5A is a plot of the locations of cells whose dot product is a maximum for each patch function, with the plot superimposed on an image that includes both a motorcycle and an airplane, according to an embodiment.

FIG. 5A is a plot 500 of the locations 520 of cells whose dot product is a maximum for each patch function, with the plot superimposed on an image 501 that includes both a motorcycle and an airplane, according to an embodiment. Image 501 is an example subject image. The locations 520 are the locations associated with the signature vector elements $C_2(i)$ in the signature vector 172 for salient patch functions. The locations form two distinct clusters, a first cluster co-located with the portion of image 501 that shows the airplane and a second cluster co-located with the portion of image 501 that shows the motorcycle.

Figure 5B:
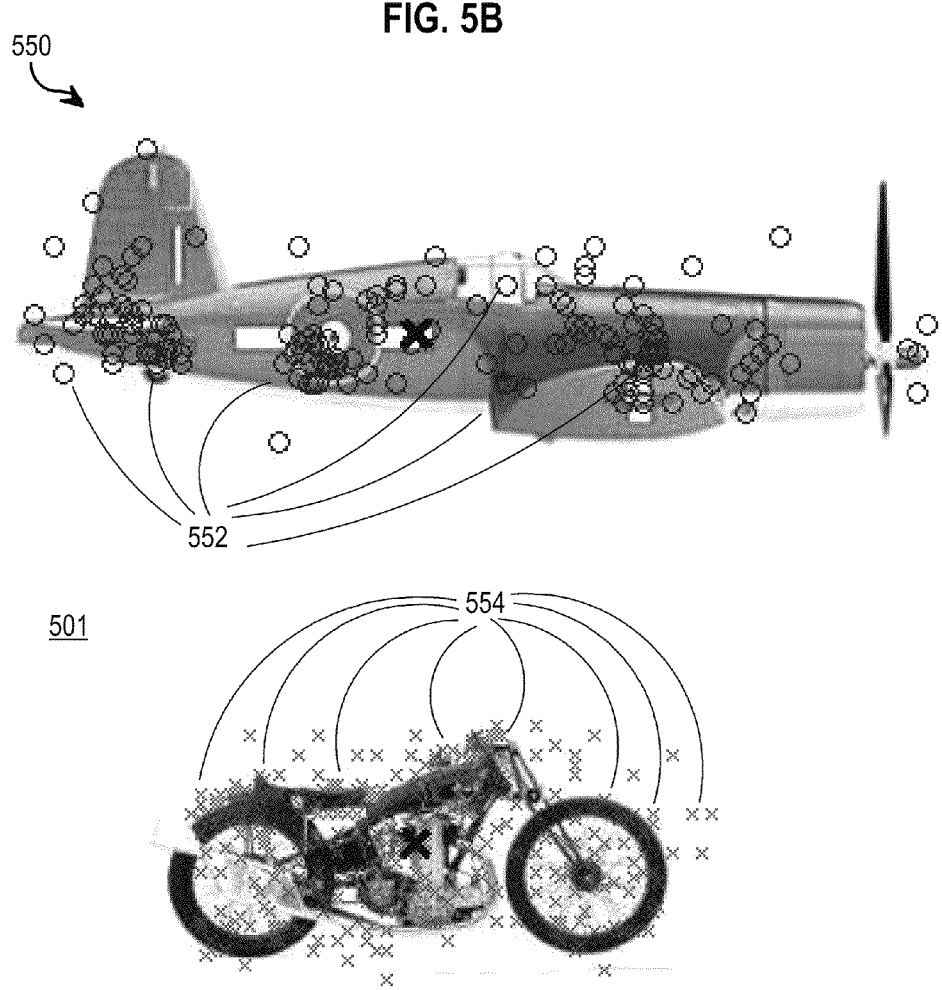
FIG. 5B is a plot of the locations of cells whose dot product is a maximum for each patch function, separated into two clusters, with the plot superimposed on an image that includes both a motorcycle and an airplane, according to an embodiment.

Any clustering algorithm may be used. For example, using a K-means clustering algorithm, one is able to associate each location with one of the two clusters. FIG. 5B is a plot 550 of the locations of cells whose dot product is a maximum for each patch function, separated into two clusters, with the plot superimposed on an image 501 that includes both a motorcycle and an airplane, according to an embodiment. The first cluster, for which members are plotted as circles 552, is co-located with the portion of image 501 that shows the airplane. The second cluster, for which members are plotted as crosses 554, is co-located with the portion of image 501 that shows the motorcycle.

In some embodiments, the subject image is divided at a line between the clusters, and each divided portion of the image is fed separately into the image processing system 100 in a feedback mechanism. In this embodiment, the system recalculates the signature vector of the intended object cropped out from the whole image. This is analogous to concentrating all the visual cortex resource on a single object.

In another embodiment, however, the signature vector 172 is divided into two or more reduced signature vectors, one for each cluster. The training set signature vectors are reduced exactly the same way. Then the feature recognition or image classification is performed using only the reduced signature vectors associated with one cluster. This embodiment is faster because no new transformation need be performed at any of the four levels of the hierarchical image processing system. It amounts to focusing the attention of the classifier 180 on one feature at a time in an image with multiple features.

Figure 5C:
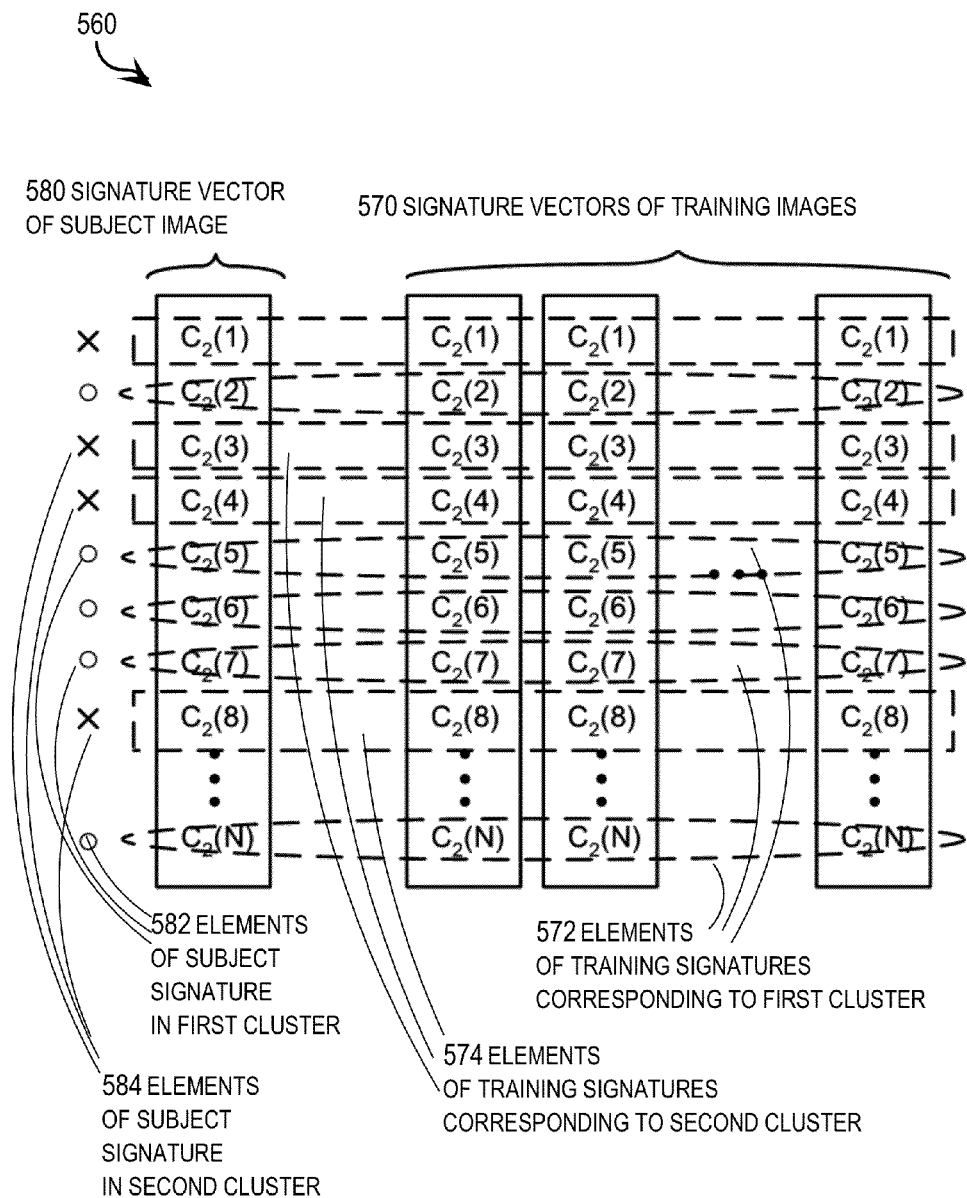
FIG. 5C is a block diagram that illustrates the signature vector elements associated with each cluster in both the subject signature vector and the trainings set signature vectors, according to an embodiment.

FIG. 5C is a block diagram 560 that illustrates the signature vector elements associated with each cluster in both the subject signature vector and the trainings set signature vectors, according to an embodiment. The training set signature vectors 570 are shown on the right side of diagram 560. The subject signature vector 580 is shown on the left side. The elements 582 of the subject image signature vector 580 associated with the first cluster are indicated by the circles. The corresponding elements 572 of the training set signature vectors 570 and an element 582 of the subject signature vector 580 in the first cluster are enclosed in a dashed ellipse for each signature element 582 in the first cluster.

The elements 584 of the subject image signature vector 580 associated with the second cluster are indicated by the crosses. The corresponding elements 574 of the training set signature vectors 570 and an element 584 of the subject signature vector 580 in the second cluster are enclosed in a dashed rectangle for each signature element 584 in the second cluster.

A first set of reduced signature vectors is produced using only those elements enclosed in a dashed ellipse. The first object is recognized based on a classifier using just these elements.

A second set of reduced signature vectors is produced using only those elements enclosed in a dashed rectangle. The second object is recognized based on a classifier using just these elements.

2.10 Image Classification

In step 270, the subject image is classified based on the subject image signature vector 172 and the training set signature vectors 172. Any classifier may be used. The classification uses one or more $C_2$ elements of the signature vector 172 as features and thus inherits the translation and scale invariance of the wavelet processing, if any. Various classifiers such as Support Vector Machines (SVMs), well known in the art, can be used in various embodiments. A simple but robust nearest neighbor classifier is applied in the experimental embodiments described below.

In some embodiments, features in the subject image are recognized based on the one or more $C_2$ elements of the subject signature vector 172 and the training set signature vectors. In some embodiments, the image is classified based on the features found in or absent from the subject image. In some embodiments, as described above, the features found in a subject image are based on $C_2$ elements of the subject signature vector 172 that belong to one cluster of positions associated with the $C_2$ elements.

3. Example Embodiments

Various embodiments of the invention are described in this section in terms of experiments and observed performance. All the experiment results were obtained with the same embodiment. Daubechies 7-9 wavelets of 3 scales were used in the wavelet transformation step 110. In the similarity transformation step 150, $I_0=1000$ patch functions $P_i$ of 4 different sizes $M_i \times M_i \times 3$ with $M=4, 8, 12, 16$ (250 patch functions at each size), were learned from the training images. The classifier 180 was the simple nearest neighbor classification algorithm.

For texture and satellite image classification as well as for language identification, one sample image of size 512×512 was available per image class; and was segmented to 16 non-overlapping parts of size 128×128. Half were used for training and the rest for testing.

3.1 Feature Recognition

For the feature recognition experiments, 4 data sets were used representing objects: airplanes, motorcycles, cars (rear) and leaves, plus a set of background images from the Caltech5 database. Some sample images are shown in FIG. 3A and FIG. 3B, described above. Preprocessing during step 210 converted the images to gray-levels and resealed them to preserve the aspect ratio so that the minimum side length was of 140 picture elements (pixels). A set of 50 positive images and 50 negative images were used for training and a different set was used for testing.

The performance measure reported herein is the receiver operating characteristic (ROC) accuracy, R, used in signal detection theory and given by Equation 8.

$$R = 1 - ((1-p)*F + p*(1-T)) \qquad (8)$$

where F and T are respectively the false positive rate on the negative samples and true positive rate on the positive samples, and p is the proportion of the positive samples.

Table 1 summarizes the object recognition performance. Results obtained with this embodiment are superior to previous approaches and comparable to Serre, but at a lower computational cost. For example, an embodiment implemented in MATLAB™ code (The MATHWORKS™, Natick, Mass.) and using only salient patch functions performs object recognition about six times faster than the approach taught in Serre. The results of others are reported in R. Fergus and P. Perona and A. Zisserman, "Object class recognition by unsupervised scale-invariant learning", CVRP, vol. 2, pp. 264-271, 2003, for airplanes, motorcycles and cars and reported in M. Weber and M. Welling and P. Perona, "Unsupervised Learning of Models for Recognition", ECCV, pp. 18-32, 2000 for leaves.

TABLE 1

| Object recognition ROC Accuracy Comparison | | | |
|---|---|---|---|
| Data set: | Illustrated Embodiment | Serre | Others |
| Airplanes | 96.0 | 96.7 | 94.0 |
| Motorcycles | 98.0 | 98.0 | 95.0 |
| Cars (rear) | 96.0 | 99.8 | 84.8 |
| Leaves | 92.0 | 97.0 | 84.0 |

Figure 8:
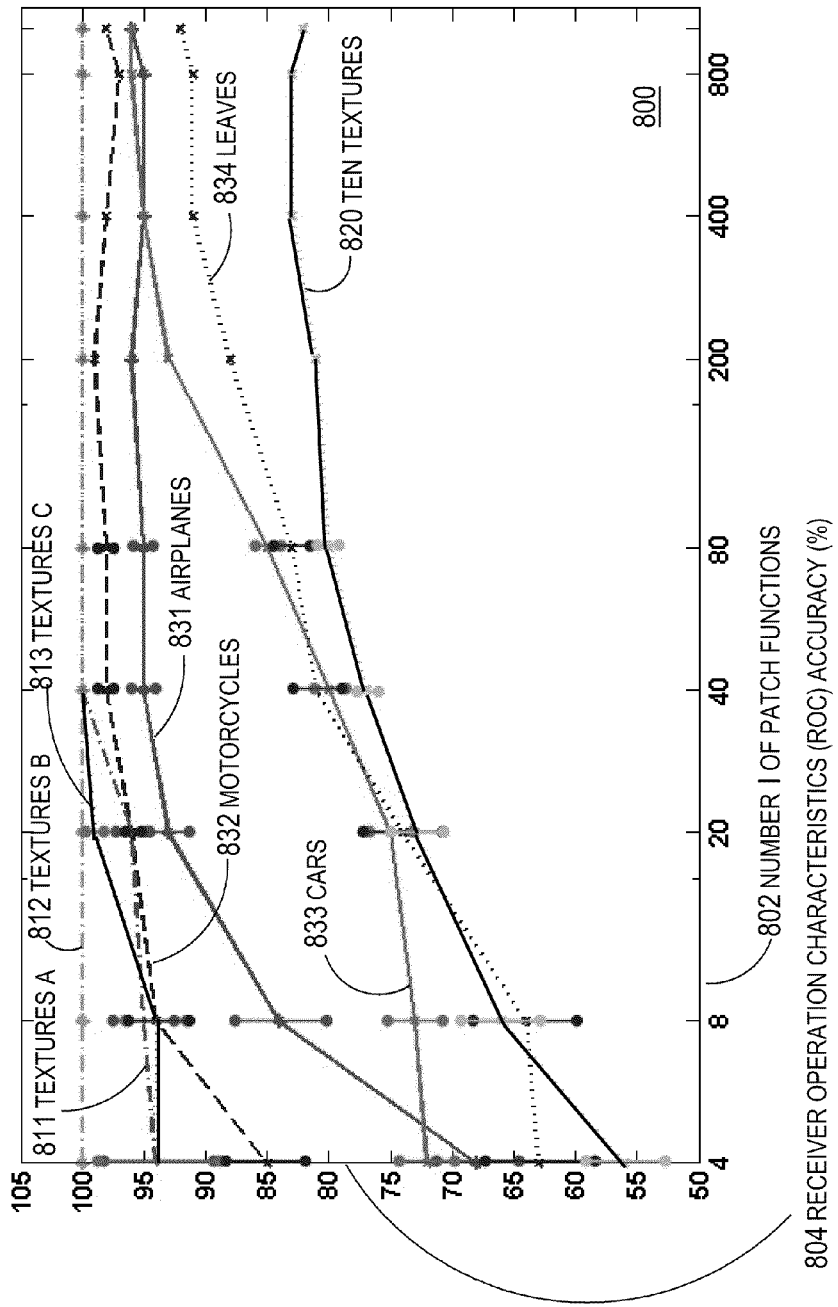
FIG. 8 is a graph that illustrates percent correct classification, according to several embodiments.

FIG. 8 is a graph 800 that illustrates percent correct classification, according to several embodiments. The horizontal axis 802 is the number I of most salient patch functions retained in the similarity transformation 150. The vertical axis is ROC accuracy, R, in percent. All performance is greater than 50% accurate. Curve 831 shows the ROC accuracy for recognizing airplanes as a function of the number I of most salient patch functions retained. Curve 832 shows the ROC accuracy for recognizing motorcycles. Curve 833 shows the ROC accuracy for recognizing cars (rear). Curve 834 shows the ROC accuracy for recognizing leaves. The curves 831, 832, 833, 834 show that the performance is improved when the number I increases; and is, in general, stable with I=200 patch functions. Other curves in FIG. 8 represent performance of other classifiers described in more detail in the following sections.

3.2 Texture Classification

FIG. 6A, FIG. 6B and FIG. 6C are pairs of images that illustrates a first, second and third binary texture classification training set, respectively, according to an embodiment. In binary classification, an image classification process is trained with only two classes of textures, e.g., texture of image 611 and texture of image 612 in FIG. 6A; texture of image 621 and texture of image 622 in FIG. 6B; or texture of image 631 and texture of image 632 in FIG. 6C. Here, a subject image contains one of the two textures of a binary pair. As described above, one sample image of size 512×512 was available per image class; and was segmented to 16 non-overlapping parts of size 128×128. Half were used for training and the rest for testing.

FIG. 7A, FIG. 7B, FIG. 7C, FIG. 7D, FIG. 7E, FIG. 7F, FIG. 7G, FIG. 7H, FIG. 7I and FIG. 7J are images that illustrate a texture classification training set for ten textures, according to an embodiment. Again, one sample image of size 512×512 was available per image class; and was segmented to 16 non-overlapping parts of size 128×128. Half were used for training and the rest for testing.

All texture images were obtained from the database, well known in the art. At the time of this writing, this database can be found online in the file brodatz.html in the directory ~tranden at the domain ux.uis.no. The texture classification results are summarized in Table 2. The illustrated embodiment achieved perfect results for binary classification. For the challenging ten-class classification, the illustrated embodiment achieved performance that was comparable to the state-of-the-art methods. The average and best state-of-the-art approaches are described in T. Randen and J. Husoy, "Filtering for Texture Classification: A Comparative Study", IEEE Trans on Image Proc, vol. 21, no. 4, pp. 291-310, 1999 (hereinafter, Randen). The binary results summarized in the column labeled "Others" are reported in K. Kim, K. Jung, S. Park, and H. Kim, "Support Vector Machines for Texture Classification", IEEE Trans. PAMI, vol. 24, no. 11, pp. 1542-1550, 2002. The ten texture results summarized in the column labeled "Others" are reported in X. Liu and D. Wang, "Texture classification using spectral histograms", IEEE Trans. PAMI, vol. 12, pp. 661-670, 2003.

TABLE 2

Texture Classification ROC Accuracy Comparison

| Texture Image Data | Illustrated Embodiment | Average (Raden) | Best (Raden) | Others |
|---|---|---|---|---|
| FIG. 6A | 100 | 88.0 | 99.3 | 91.5 |
| FIG. 6B | 100 | 96.2 | 99.7 | — |
| FIG. 6C | 100 | 87.6 | 97.5 | 88.6 |
| FIG. 7A to 7J | 82.5 | 52.6 | 67.7 | 83.1 |

In FIG. 8, Curve 811, curve 812 and curve 813 shows the ROC accuracy for binary texture classification for the first pair, the second pair and the third pair of textures, respectively, as a function of the number I of most salient patch functions retained. Curve 820 shows the ROC accuracy for the ten-texture classification. FIG. 8 shows that stable performance is achieved with as few as I=40 most salient patch functions, which confirms the good texture classification results shown in Table 2 and the robustness of the illustrated embodiment.

In another embodiment, gray levels are used to further distinguish textures with similar geometrical patters but different relief, as reflected in range of gray levels. For each texture picture, a histogram of wavelet approximation coefficients is determined (which is actually a low-pass filtered version of the picture). Histograms are standard tools in image processing that count the distribution of the gray-level of the pixels. A histogram vector is generated with each element representing a gray level and the value of the element representing the count. When a simple nearest neighbor classification was performed during step 270, the distance between two texture pictures was a weighted sum of the difference of their signatures (e.g., C2 coefficients) and the distance between their histogram vectors. This improves the texture classification performance when different textures have similar geometrical features (thus similar wavelet coefficients) but different gray-level ranges.

3.3 Classification of Satellite Images of Earth

Figure 9A:
FIG. 9A, FIG. 9B, FIG. 9C and FIG. 9D are images that illustrate a portion of a satellite image classification training set for four terrain types, according to an embodiment.
Figure 9B:
Figure 9C:
Figure 9D:
Figure 11A:
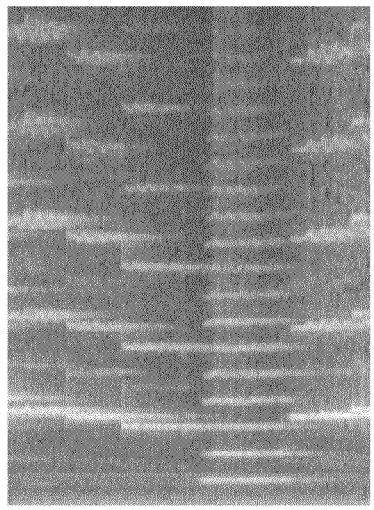
FIG. 11A, FIG. 11B, FIG. 11C, FIG. 11D and FIG. 11E are images that illustrate a portion of audio classification training set for five instrument types, according to an embodiment.
Figure 11B:
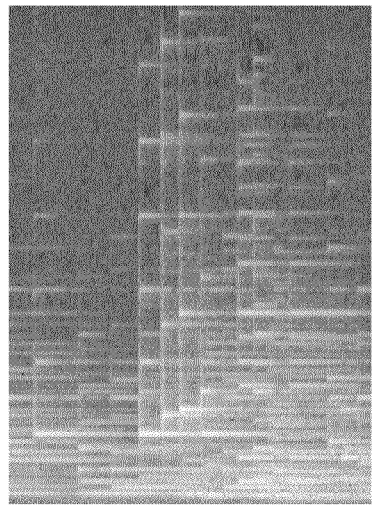
Figure 11C:
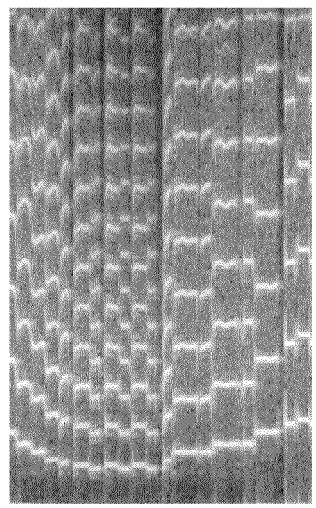
Figure 11D:
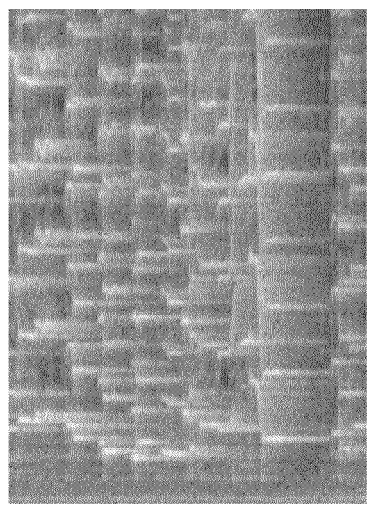
Figure 11E:
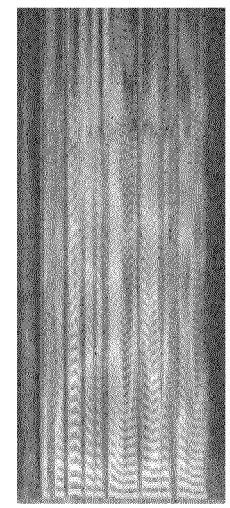

FIG. 9A, FIG. 9B, FIG. 9C and FIG. 9D are images that illustrate a portion of a satellite image classification training set for four terrain types, respectively, according to an embodiment. FIG. 9A depicts forest terrain; FIG. 9B depicts urban terrain; FIG. 9C depicts rural terrain; and, FIG. 9D depicts sea. As described above, one sample image of size 512×512 was available per image class; and was segmented to 16 non-overlapping parts of size 128×128. Half were used for training and the rest for testing. These images depict terrain at 0.5 meter resolution at the Earth's surface. Since access to images at other resolutions is restricted, images at resolutions of 1 m and 2 m were simulated by Gaussian convolution and sub-sampling.

A first experiment tested the multi-terrain classification of the images at a single resolution (0.5 m). 100% classification accuracy was achieved for images of all 4 terrain classes.

A second experiment validated the scale invariance of the illustrated embodiment. Images at resolution 0.5 m were used to train the classifier while the classification was tested on images at resolutions 1 m and 2 m. Again the classification accuracy was 100%—the same as reported in a recent work described in B. Luo, J-F. Aujol, Y. Gousseau, S. Ladjal, "Indexing of satellite images with different resolutions by wavelet features", IEEE Trans Image Proc, accepted, 2008; and significantly higher than earlier methods referenced therein. In addition, image resolution is assumed to be known in the recent work; whereas the illustrated embodiment does not need this information, thanks to its scale invariance.

3.4 Classification of Images of Languages

FIG. 10A, FIG. 10B, FIG. 10C, FIG. 10D, FIG. 10E and FIG. 10F are images that illustrate a portion of a language classification training set for six languages, according to an embodiment. The six languages are Arabic, Chinese, English, Greek, Japanese, and Korean, respectively, and represent six classes of features. As described above, one sample image of size 512×512 was available per image class; and was segmented to 16 non-overlapping parts of size 128×128. Half were used for training and the rest for testing Language identification aims to determine the underlying language of a document in an imaged format, and is often carried out as a preprocessing step for optical character recognition (OCR). Based on principles totally different from traditional approaches, the illustrated embodiment achieved 100% success rate in the 6-language identification task.

3.5 Multiple Object Images

Recognition performance tends to degrade when multiple features of interest are presented in the same subject image. For example, a multiple-object image was searched for a feature of interest, e.g., an airplane, through a binary classification against a subject image that includes a leaf, a motorcycle and a car in addition to an airplane. Due to the perturbation from the neighboring objects, the recognition accuracy without clustering of signature vector positions is as low as 74%. The clustering of signature vector positions, described above, improves the accuracy considerably, to 98%, by focusing attention on each object in turn.

3.6 Sound Spectra-Time Images

FIG. 11A, FIG. 11B, FIG. 11C, FIG. 11D and FIG. 11E are images that illustrate a portion of an audio classification training set for five instrument types, according to an embodiment. These show the time-frequency representation of 5 types of sounds that were used in a 5-instrument sound classification: flute, piano, trumpet, violin and human voice, respectively. In preliminary tests, the following steps were taken: 1] about 2 minute recordings were collected for each type of sound; 2] the recordings were transformed to time-frequency representations; 3] the time-frequency representation were segmented into time clips of length 5 seconds; 4] half the time clips were selected at random for a training set and the other half for test subject images. The rest of the process is as described above for two-dimensional image classification. The illustrated embodiment achieved 100% accuracy, as expected for texture classifications.

In another embodiment, the input images are soundtracks and the wavelet transform is replaced by spectrogram generation. In some of these embodiments, the input subject or some or all of training images, or both, are already spectrograms and a first transformation is omitted in part or entirely.

In an illustrated embodiment, both the wavelet transform 110 and the local metric determination 130 are skipped; and the patch function is both based on and applied directly to the sound time-frequency representations. This is equivalent to a local metric based on cell sizes equal to the granularity of the log-spectrograms, i.e., a cell size of 1×1.

Figure 13:
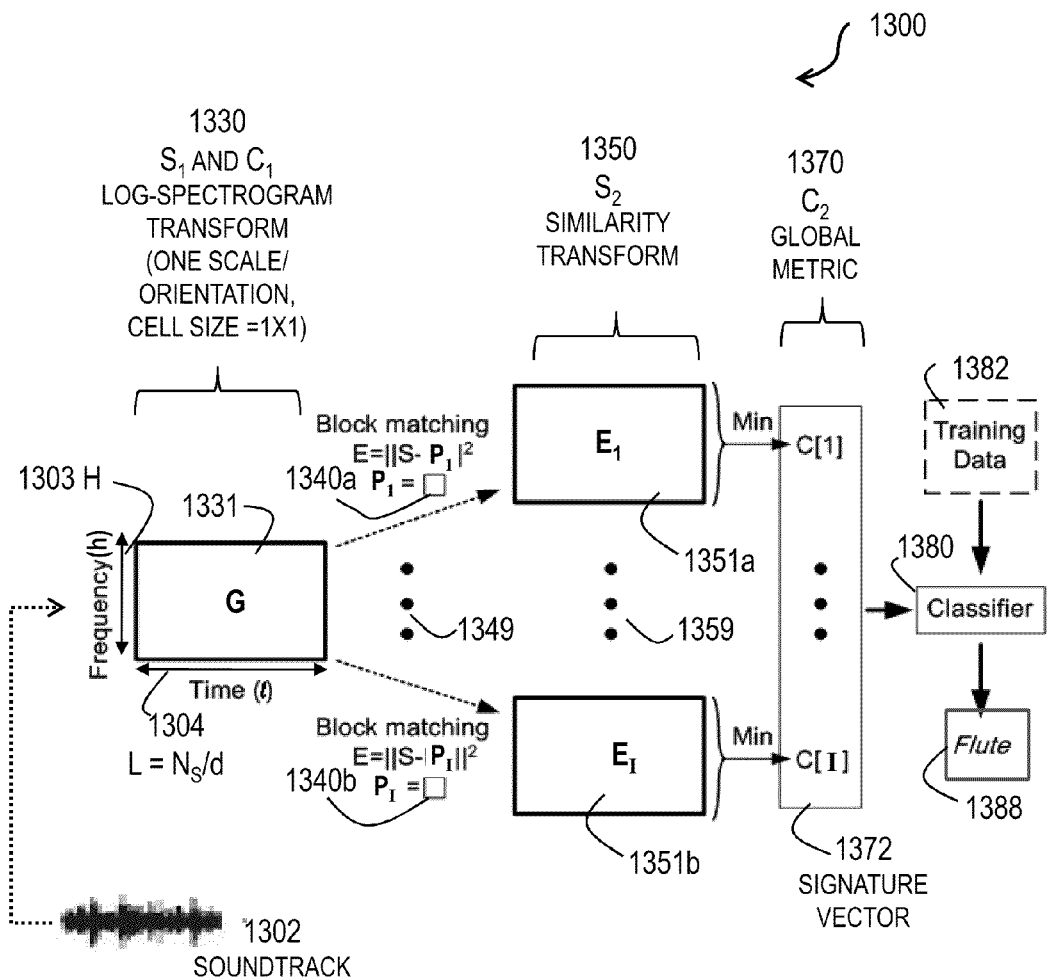
FIG. 13 is a block diagram that illustrates a hierarchical image processing system that involves spectrograms, according to an embodiment.

FIG. 13 is a block diagram that illustrates a hierarchical image processing system 1300 that involves spectrograms, according to an embodiment. The soundtrack 1302 represents acoustic pressure as a function of time at a sampling rate sufficient for a human auditory system, e.g., 20 kiloHertz (kHz, 1 kHz=$10^3$ Hertz, Hz; 1 Hz=1 sample per second). The series of audio signal values is represented by a(n), n=0,$N_S$–1 where $N_S$ is the number of audio samples in the soundtrack.

In a first transform 1330 the soundtrack 1302 is converted to a log-spectrogram G 1331 (analogous to one scale and orientation of the wavelet transforms described above) which is used also as the local metric, i.e., cell size=1×1, as described in more detail below. The log-spectrogram G represents the spectral content at H frequencies in the vertical dimension 1303 for each of L time intervals shifted by a sample difference d in the horizontal dimension 1304, thus L=$N_S$/d. In the $S_2$ similarity transform 1350, a similarity matrix E is determined based on the differences between different parts of the log-spectrogram and each patch function Pi of 1 patch functions. The patch functions Pi, i=1,I are defined on portions of a training set of log-spectrograms, as described below, and may be different sizes. The I patch functions are depicted in FIG. 13 as the first $P_1$ 1340a, the last $P_1$ 1340b, and zero or more intervening patch functions represented by ellipsis 1349. Thus there are I similarity matrices, depicted in FIG. 13 as the first $E_1$ 1351a, the last $E_1$ 1351b and zero or more others represented by ellipsis 1359. Unlike the similarity matrix $S_2$ used in process 100 depicted in FIG. 1, this similarity matrix E is not a dot product that increases with increasing similarity, but a measure of the difference from the patch functions that decreases with increasing similarity. Thus the global metric transform 1370 is based on a minimum value found in each similarity matrix. The vector of I global metrics constitutes a signature vector 1372 that is fed to a classifier 1380. The classifier 1380 compares the signature vector 1372 to signatures of the training data 1382 to produce a classification 1388 for the soundtrack 1302. As described above, the classification can be based on a subset of the signature vector that includes only the global metrics for the most salient patch functions.

The algorithm consists of three steps, as shown in FIG. 13. After transforming the signal into a time-frequency presentation, feature extraction is performed by differencing the time-frequency plane with a number of time-frequency patch functions previously learned. The minimum matching energy of the blocks makes a feature vector of the audio signal and is sent to a classifier.

Thus, in embodiments with an input image as a soundtrack (1 dimensional signal), the soundtrack is transformed to a time-frequency representation (2 dimensional signal) using any method known in the art. The time-frequency representation provides a good domain for audio classification for several reasons. First, of course, as the time-frequency transform is invertible, the time-frequency representation contains complete information of the audio signal. More importantly, the texture-like time-frequency representations usually contain distinctive patterns that capture different characteristics of the audio signals. For example, Trumpet sounds (FIG. 11C) often contain clear onsets and stable harmonics, resulting in clean vertical and horizontal structures in the time-frequency plane. Piano recordings (FIG. 11B) are also rich in clear onsets and stable harmonics, but they contain more chords and the tones tend to transit fluidly, making the vertical and horizontal time-frequency structures denser. Flute pieces (FIG. 11A) are usually soft and smooth. Their time-frequency representations contain hardly any vertical structures, and the horizontal structures include rapid vibrations. Such textural properties can be easily learned by the technique presented here without explicit detailed analysis of the corresponding patterns.

In an illustrated embodiment, a short-time Fourier transform, commonly used in audio-processing and recognition, is used on H audio samples at a time, where H<<$N_S$. The H audio samples are subjected to a Hanning window w of support size H that weights each sample by a value between 0 and 1, as is well known in the art. The result is a spectrum of H Fourier coefficients A(h), h=1, H. The Hanning window w of support size H is shifted by a sample difference of d≤H to determine the next spectrum using the short-time Fourier transform. L spectra result A(l,h), l=1,L; h=1,H. The short-time Fourier transform A of the audio data a(n) is given in Equation 9a and 9b.

$$A(l, h) = \sum_{m=0, N_S-1} a(n) \cdot g^*_{l,h}(n) \quad (9a)$$

where the time-frequency atom $g_{l,h}$ is $$g_{l,h} = w(n-l\,d)\exp(i2\pi hn/H) \quad (9b)$$

and * denotes a complex conjugate.

As human perception of sound intensity is logarithmic, in the illustrated embodiment, the transformation 1330 includes the computation of a log-spectrogram G using Equation 10.

$$G(l,h) = \log[A(l,h)] \quad (10)$$

The patch functions $P_i$ are learned by randomly sampling portions of the log-spectrograms of multiple training sets with blocks of various sizes and retaining the most salient for discriminating the sound types (e.g., instruments) in the training set. These most salient blocks, with varying time axis lengths of $L_i$ and frequency axis widths of $H_i$, respectively, are the patch functions $P_i$, which contain some time-frequency structures of audio signals of various types. Similar to Equation 5 above, the ith patch function is given by Equation 11

$$P_i(l',h') = G_T(l',h')_i \quad (11)$$

where l'∈ [$l_i$ to $l_i+L_i$]
and h'∈ [$h_i$ to $h_i+H_i$]
and $G_T$ is a log spectrogram of a training set. Each block is extracted at a random position from the log-spectrogram $G_T$ of a randomly selected training audio sample. Blocks of various sizes are applied to capture time-frequency structures at different durations and bandwidth. Since audio log-spectrogram representations are rather stationary images and often contain repetitive patterns, the random sampling learning is particularly efficient. Patterns that appear with high probability are likely to be learned To characterize an audio signal in a subject soundtrack, the algorithm first matches the subject log-spectrogram G with the sliding patch functions $P_i$ over all i=1, I, by determining the mean square difference as the similarity measure E, according to Equation 12.

$$E(l, h, i) = \sum_{h''=1,H_i} \sum_{l''=1,L_i} \underline{G}\left(\begin{array}{c} l+l''-1, \\ h+h''-1 \end{array}\right) - \frac{\underline{P_i(l'', h'')}}{(H_i L_i)} \quad (12)$$

where the underline indicates the quantity is normalized to unit energy over the subtraction block (e.g., $\underline{X}=X/\|X\|$). The use of normalized quantities provides loudness invariance, so that the classification result is not subject to a loudness difference between the training set and the subject soundtrack. E(l,h,i) measures the degree of resemblance between the patch function $P_i$ and locally normalized log-spectrogram G at position [l,h].

A minimum operation, expressed in Equation 13, is then performed on the difference map E(l,h,i) to extract the highest degree of resemblance locally between G and $P_i$, expressed as C(i) in Equation 13.

$$C(i) = \min_{l,h} E(l, h, i) \quad (13)$$

The coefficients C(i), i=1, I are time-frequency translation invariant. They constitute a feature vector {C[i]} of size I of the audio signal. Note that a fast implementation of the patch function matching operation (12) can be achieved by using convolution.

The audio classification scheme is evaluated through musical instrument recognition. Solo phrases of eight instruments from different families, namely flute, trumpet, tuba, violin, cello, harpsichord, piano and drum, were considered. Multiple instruments from the same family, violin and cello for example, were used to avoid over-simplification of the problem. To prepare the experiments, great effort was dedicated to collect data from divers sources with enough variation, as few databases are publicly available. Sound samples were mainly excerpted from classical music CD recordings of personal collections. A few were collected from internet For each instrument at least 822-second sounds were assembled from more than 11 recordings, as summarized in Table 3. All recordings were segmented into non-overlapping excerpts of 5 seconds. Of these, 50 excerpts (250 seconds) per instrument are randomly selected to construct respectively the training and test data sets. The training and test data were selected so that they did not contain the same excerpts. Furthermore, in order to avoid bias, excerpts from the same recording were never included in both the training set and the test set.

TABLE 3

Sound data set.

| | Violin | Cello | Piano | Harpsichord | Trumpet | Tuba | Flute | Drum |
|---|---|---|---|---|---|---|---|---|
| Recordings | 27 | 35 | 31 | 68 | 11 | 15 | 12 | 22 |
| Time (sec) | 7505 | 7317 | 6565 | 11036 | 822 | 1504 | 2896 | 2024 |

Human sound recognition performance seems not degrade if the signals are sampled at 11 kHz. Therefore signals were down-sampled to 11.025 kHz to limit the computational load. Half overlapping Hanning windows of length 50 milliseconds (ms, 1 ms=$10^{-3}$ seconds) were applied in the short-time Fourier transform (e.g., H=50*11.025, d=25*11.025). Time-frequency blocks of seven sizes 16×16, 16×8 and 8×16, 8×8, 8×4 and 4×8 and 4×4 that cover time-frequency areas of size from 640 Hz×800 ms to 160 Hz×200 ms were used, same number for each, to capture time-frequency structures at different durations and bandwidths. The classifier 1380 was a simple nearest neighbor classification algorithm.

Of course, the parameter H and the choice of window function can be different in different embodiments. The choice might advantageously depends on the application. For example, if the soundtracks to classify contain lots of attacks, one may want to use windows with a smaller size H that is better localized in time. In other embodiments, other time-frequency transforms different from the short time Fourier Transform are applied.

Figure 14:
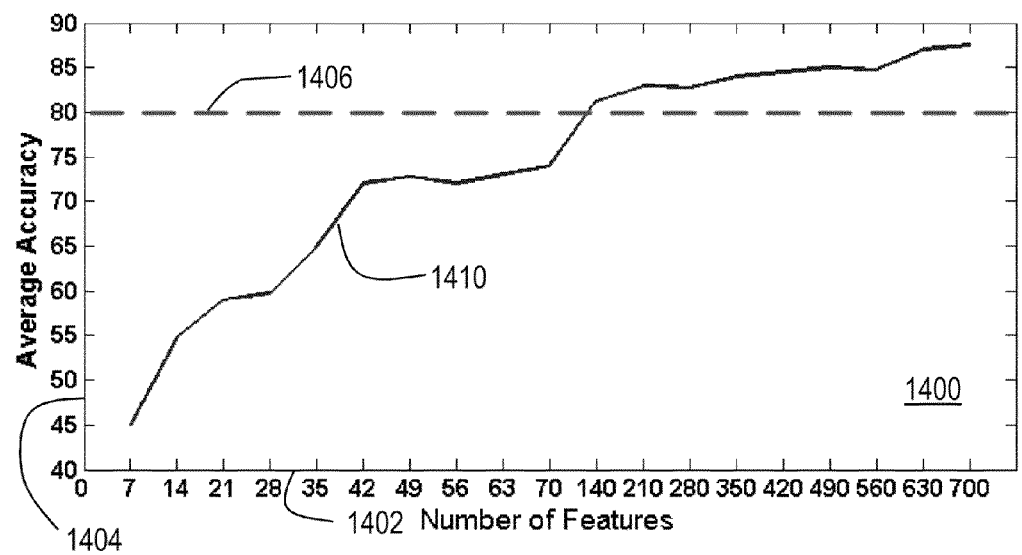
FIG. 14 is a graph that illustrates accuracy as a function of the size of the signature vector, according to an embodiment.

FIG. 14 is a graph 1400 that illustrates accuracy as a function of the size of the signature vector, according to an embodiment. The horizontal axis 1402 is number of patch functions; and the vertical axis is the average accuracy in percent. The 80% accuracy value is indicated by horizontal line 1406. The curve 1410 shows the accuracy of classifying soundtracks by instrument in the illustrated embodiment. The size of the signature vector is given by the number of patch function, which is equal to the number of sizes (seven in the illustrated embodiment) times the number of number of different patch patterns retained at each size. In the illustrated embodiment, the same number of different patterns (between 1 and 100) was kept at each size. Graph 1400 is useful to determine how many of the most salient patterns at each size should be included to better discriminate among the classes of sounds.

The performance rises rapidly to a reasonably good accuracy of 80% when the number of patch functions, and hence size of the signature vector, increases to about 140. The accuracy continues to improve slowly thereafter and becomes stable at about 85%, very satisfactory, after the number of features goes over 350. Although this number of spectrogram features appears to be much larger than the number of carefully designed classical acoustic features (about 20) commonly used in literature, the computation of the signature vector 1372 is uniform and very fast Table 4 presents a confusion matrix for musical instrument classification, according to the illustrated embodiment. Each entry is the rate at which the row instrument is classified as the column instrument. The confusion matrix in Table 2 shows the classification details (with 420 features) of each instrument. The highest confusion occurred between the harpsichord and the piano, which can produce very similar sounds.

Other pairs of instruments which may produce sounds of similar nature, such as flute and violin, were occasionally confused. Some trumpet excerpts were confused with violin and flute—these excerpts were found to be rather soft and contained mostly harmonics. The most distinct instrument was the drum, with the lowest confusion rate. Overall, the average accuracy was 85.5%.

TABLE 4

Confusion matrix - percent that row instrument was classified as column instrument.

| | Violin | Cello | Piano | Harpsichord | Trumpet | Tuba | Flute | Drum |
|---|---|---|---|---|---|---|---|---|
| Violin | 94 | 0 | 0 | 0 | 2 | 0 | 4 | 0 |
| Cello | 0 | 84 | 6 | 10 | 0 | 0 | 0 | 0 |
| Piano | 0 | 0 | 86 | 8 | 6 | 0 | 0 | 0 |
| Harpsichord | 0 | 0 | 26 | 74 | 0 | 0 | 0 | 0 |
| Trumpet | 8 | 2 | 2 | 0 | 80 | 0 | 8 | 0 |
| Tuba | 2 | 4 | 2 | 0 | 0 | 90 | 0 | 2 |
| Flute | 6 | 0 | 0 | 0 | 0 | 0 | 94 | 0 |
| Drum | 0 | 0 | 0 | 0 | 0 | 2 | 0 | 98 |

In these experiments, the illustrated embodiment relying purely on time-frequency texture features achieves surprisingly good performance at musical instrument classification. It is anticipated that this technique could be adapted to simplify the still largely unsolved problem of instrument separation in polyphonic music. In principle, the technique could be similarly applicable to other types of sounds, such as e.g. "natural sounds" in the sense presented by J. H. McDermott, A. J, Oxenham "Spectral completion of partially masked sounds", PNAS, 105 (15), 5939-5944, 2008.

4. Hardware Overview

Figure 12:
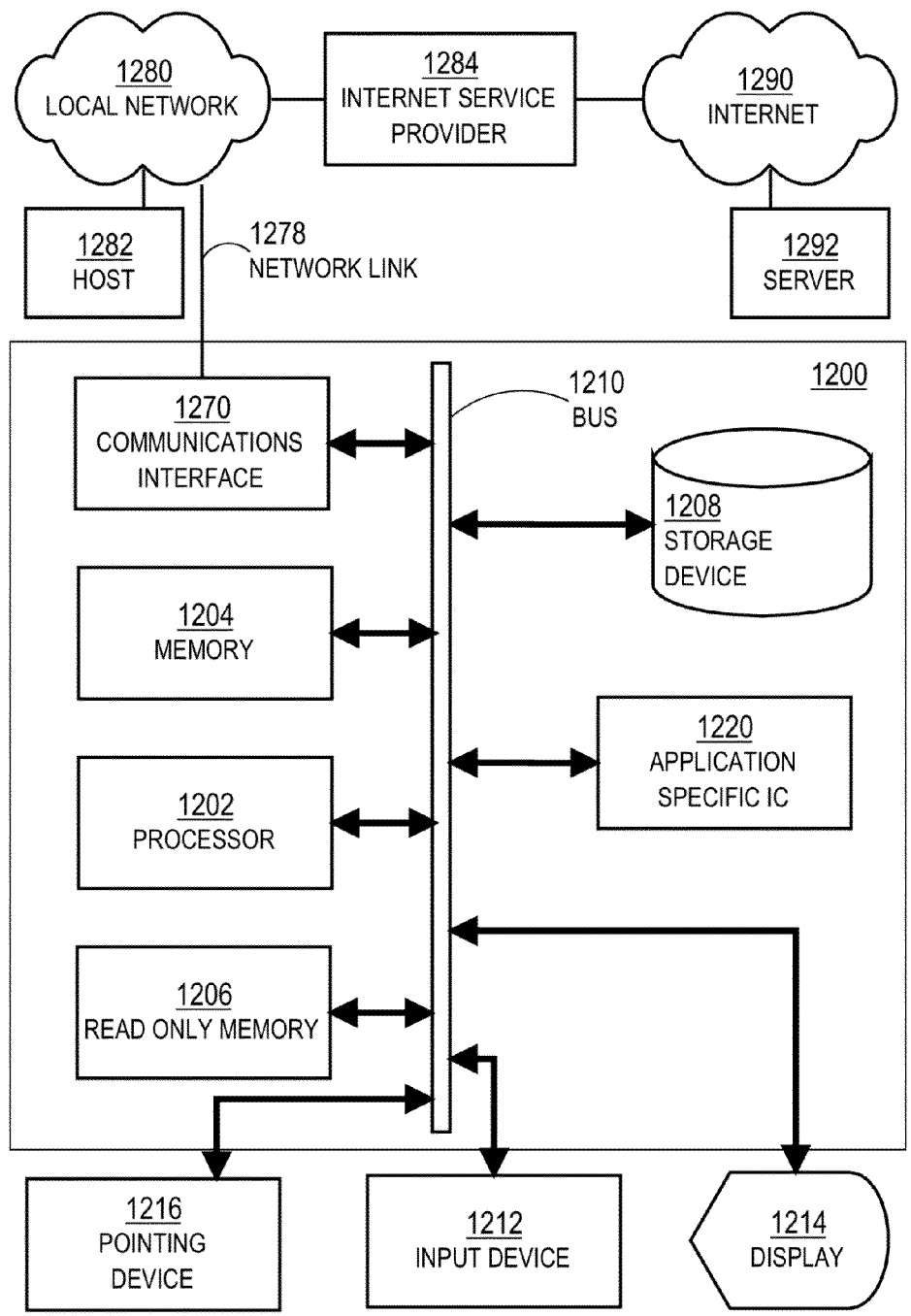
FIG. 12 is a block diagram that illustrates a computer system upon which an embodiment of the invention may be implemented.

FIG. 12 is a block diagram that illustrates a computer system 1200 upon which an embodiment of the invention may be implemented. Computer system 1200 includes a communication mechanism such as a bus 1210 for passing information between other internal and external components of the computer system 1200. Information is represented as physical signals of a measurable phenomenon, typically electric voltages, but including, in other embodiments, such phenomena as mechanical, magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 1210 includes many parallel conductors of information so that information is transferred quickly among devices coupled to the bus 1210. One or more processors 1202 for processing information are coupled with the bus 1210. A processor 1202 performs a set of operations on information. The set of operations include bringing information in from the bus 1210 and placing information on the bus 1210. The set of operations also typically include comparing two or more units of information, shifting positions of units of information, and combining two or more units of information, such as by addition or multiplication. A sequence of operations to be executed by the processor 1202 constitute computer instructions.

Computer system 1200 also includes a memory 1204 coupled to bus 1210. The memory 1204, such as a random access memory (RAM) or other dynamic storage device, stores information including computer instructions. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of computer instructions. The computer system 1200 also includes a read only memory (ROM) 1206 or other static storage device coupled to the bus 1210 for storing static information, including instructions, that is not changed by the computer system 1200. Also coupled to bus 1210 is a non-volatile (persistent) storage device 1208, such as a magnetic disk or optical disk or flash drive, for storing information, including instructions, that persists even when the computer system 1200 is turned off or otherwise loses power.

In many embodiments, information, including instructions, is provided to the bus 1210 for use by the processor from an external input device 1212, such as a keyboard containing alphanumeric keys operated by a human user, or a sensor. A sensor detects conditions in its vicinity and transforms those detections into signals compatible with the signals used to represent information in computer system 1200. Other external devices coupled to bus 1210, used primarily for interacting with humans, include a display device 1214, such as a cathode ray tube (CRT) or a liquid crystal display (LCD) or a plasma screen, for presenting images, and a pointing device 1216, such as a mouse or a trackball or cursor direction keys, for controlling a position of a small cursor image presented on the display 1214 and issuing commands associated with graphical elements presented on the display 1214.

In the illustrated embodiment, special purpose hardware, such as an application specific integrated circuit (IC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a two-way communication coupling to a variety of external devices that operate with their own processors, such as printers, scanners and external disks. In general, the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1270 sends and receives electrical, acoustic or electromagnetic signals, including infrared and optical signals, that carry information streams, such as digital data.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and waves that travel through space without wires or cables, such as acoustic waves and electromagnetic waves, including radio, optical and infrared waves. The term computer-readable storage medium, as used herein, excludes transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes or knobs, a RAM, a programmable ROM (PROM), an erasable PROM (EPROM), a FLASH-EPROM, or any other memory chip or cartridge, signals on a carrier wave, or any other medium from which a computer can read.

Network link 1278 typically provides information communication through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290. A computer called a server 1292 connected to the Internet provides a service in response to information received over the Internet. For example, server 1292 provides information representing video data for presentation at display 1214.

The invention is related to the use of computer system 1200 for implementing the techniques described herein. According to one embodiment of the invention, those techniques are performed by computer system 1200 in response to processor 1202 executing one or more sequences of one or more instructions contained in memory 1204. Such instructions, also called software and program code, may be read into memory 1204 from another computer-readable medium such as storage device 1208. Execution of the sequences of instructions contained in memory 1204 causes processor 1202 to perform one or more of the method steps described herein. In alternative embodiments, hardware, such as application specific integrated circuit 1220, may be used in place of or in combination with software to implement the invention. Thus, embodiments of the invention are not limited to any specific combination of hardware and software, unless otherwise stated.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server 1292 transmits program code for a particular application, requested by a message sent from computer 1200, through Internet 1290, ISP equipment 1284, local network 1280 and communications interface 1270. The received code may be executed by processor 1202 as it is received, or may be stored in storage device 1208 or other non-volatile storage for later execution, or both. In this manner, computer system 1200 may obtain application program code in the form of a signal on transmission media such as a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

5. Extensions and Modifications

In the foregoing specification, the invention has been described with reference to specific embodiments thereof It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining a feature in a subject image, comprising:
    performing a sparse transform on a subject image, wherein the sparse transform is selected from a group comprising a wavelet transform and a Fourier transform, to determine a sparse transformed subject image that represents the subject image with a few significant coefficients compared to a number of values in the subject image at each of a plurality of orientations;

receiving a plurality of number I of patch functions that each is based on a portion of a sparse transformed image at corresponding orientations for a selected image of a training set of images, wherein the plurality of patch functions represent learned features in the training set; and sending data that indicates a feature in the subject image based on the transformed subject image and the plurality of patch functions.

2. A non-transitory computer-readable medium carrying one or more sequences of instructions for determining a feature in a subject image, wherein execution of the one or more sequences of instructions by one or more processors causes the one or more processors to perform:

performing a sparse transform on a subject image, wherein the sparse transform is selected from a group comprising a wavelet transform and a Fourier transform, to determine a sparse transformed subject image that represents the subject image with a few significant coefficients compared to a number of values in the subject image at each of a plurality of orientations;

receiving a plurality of number I of patch functions that each is based on a portion of a sparse transformed image at corresponding orientations for a selected image of a training set of images, wherein the plurality of patch functions represent learned features in the training set; and determining a feature in the subject image based on the transformed subject image and the plurality of patch functions.

3. A non-transitory computer-readable medium as recited in claim 2, wherein the image is a one-dimensional data set, such as a soundtrack data.

4. A non-transitory computer-readable medium as recited in claim 2, wherein the image is a two-dimensional data set, such as a picture or a time-frequency plot of recorded sound.

5. A non-transitory computer-readable medium as recited in claim 2, wherein the image is a three-dimensional data set, such as video data or a scanned volume comprising multiple scans of a two-dimensional scanning system.

6. A non-transitory computer-readable medium as recited in claim 3, wherein determining the sparse transformed subject image comprises determining a log-spectrogram of soundtrack data.

7. A non-transitory computer-readable medium as recited in claim 2, wherein determining a feature in the subject image further comprises determining the feature regardless of feature location or size or orientation in the subject image.

8. A non-transitory computer-readable medium as recited in claim 2, wherein determining the sparse transformed subject image comprises performing a wavelet transformation of the subject image to produce a plurality of transformed subject images wherein each transformed image of the plurality of transformed images represents wavelet coefficients for a different combination of scale and orientation.

9. A non-transitory computer-readable medium as recited in claim 2, wherein determining a feature in the subject image based on the transformed subject image and the plurality of patch functions further comprises:

determining for each patch function a similarity S of cell values in a local metric matrix based on the transformed subject image with the patch function positioned on the cell; and determining a signature vector with a number I elements, wherein the ith element of the signature vector is a scalar measure of values of S produced from the similarity values of the ith patch function, $P_i$, wherein the signature vector indicates which learned features are in the subject image.

10. A non-transitory computer-readable medium as recited in claim 8, wherein receiving the plurality of number I of patch functions further comprises:

performing a wavelet transformation of each of the training images to produce a plurality of transformed training images wherein each transformed training image represents wavelet coefficients for a different combination of scale and orientation; and determining each patch function $P_i$ by selecting from one or more local metric matrices based on corresponding transformed training images a sample in a spatial window of maximum dimension $M_i$ that is small compared to the size of the local metric matrix for each orientation at a particular scale, wherein i varies from 1 to I.

11. A non-transitory computer-readable medium as recited in claim 2, wherein receiving the plurality of number I of patch functions further comprises:

determining a greater plurality of patch functions of number $I_0$ greater than I;

determining for each patch function a similarity S of cell values in a local metric matrix based on the transformed training images with the patch function positioned on the cell;

determining a variance vector with a number $I_0$ elements, wherein each element of the variance vector is a measure of difference among similarity values S over the plurality of training images with each patch function; and retaining only the I patch functions corresponding to I elements of the variance vector associated with the greatest differences.

12. A non-transitory computer-readable medium as recited in claim 2, wherein determining the plurality of number I of patch functions further comprises:

determining a greater plurality of patch functions of number $I_0$ greater than I;

determining a plurality of I clusters of patch functions; and retaining only one patch function in each of the plurality of I clusters.

13. A non-transitory computer-readable medium as recited in claim 8, wherein:

the plurality of number I of patch functions are based on a wavelet transformation of each of the training images, which produces a plurality of transformed training images wherein each transformed training image represents wavelet coefficients for a different combination of scale and orientation; and each patch function $P_i$, for i varying from 1 to I, is determined by selecting from one or more local metric matrices based on corresponding transformed training images a sample in a spatial window of maximum dimension $M_i$ that is small compared to the size of the local metric matrix for each orientation at a particular scale.

14. A non-transitory computer-readable medium as recited in claim 2, further comprising classifying the image based on the feature in the subject image.

15. An apparatus for determining a feature in an image, comprising:

means for performing a sparse transform on a subject image, wherein the sparse transform is selected from a group comprising a wavelet transform and a Fourier transform, to determine a sparse transformed subject image that represents the subject image with a few significant coefficients compared to a number of values in the subject image at each of a plurality of orientations;

means for-receiving a plurality of number I of patch functions that each is based on a portion of a sparse transformed image at corresponding orientations for a selected image of a training set of images, wherein the plurality of patch functions represent learned features in the training set; and means for determining a feature in the subject image based on the transformed subject image and the plurality of patch functions.

16. An apparatus for determining a feature in an image, comprising logic encoded in a tangible medium and configured to:

perform a sparse transform on a subject image, wherein the sparse transform is selected from a group comprising a wavelet transform and a Fourier transform, to determine a sparse transformed subject image that represents the subject image with a few significant coefficients compared to a number of values in the subject image at each of a plurality of orientations;

receive a plurality of number I of patch functions that each is based on a portion of a sparse transformed image at corresponding orientations for a selected image of a training set of images, wherein the plurality of patch functions represent learned features in the training set; and determine a feature in the subject image based on the transformed subject image and the plurality of patch functions.

17. The apparatus as recited in claim 16, wherein the image is a one-dimensional data set, such as a soundtrack data.

18. The apparatus as recited in claim 16, wherein the image is a two-dimensional data set, such as a picture or a time-frequency plot of recorded sound.

19. The apparatus as recited in claim 16, wherein determining a feature in the subject image further comprises determining the feature regardless of feature location or size or orientation in the subject image.

20. The apparatus as recited in claim 16, wherein determining the sparse transformed subject image comprises performing a wavelet transformation of the subject image to produce a plurality of transformed subject images wherein each transformed image of the plurality of transformed images represents wavelet coefficients for a different combination of scale and orientation.

21. A method for determining a feature in a subject image, comprising:

performing a sparse transform on a subject image, wherein the sparse transform is selected from a group comprising a wavelet transform and a Fourier transform, to determine a sparse transformed subject image that represents the subject image with a few significant coefficients compared to a number of values in the subject image at each of one or more orientations;

receiving a plurality of number I of patch functions that each is based on a random portion of a sparse transformed image at corresponding orientations for a randomly selected image of a training set of images, wherein the plurality of patch functions represent learned features in the training set; and sending data that indicates a feature in the subject image based on the transformed subject image and the plurality of patch functions.

22. A non-transitory computer-readable medium carrying one or more sequences of instructions for determining a feature in a subject image, wherein execution of the one or more sequences of instructions by one or more processors causes the one or more processors to perform:

performing a sparse transform on a subject image, wherein the sparse transform is selected from a group comprising a wavelet transform and a Fourier transform, to determine a sparse transformed subject image that represents the subject image with a few significant coefficients compared to a number of values in the subject image at each of one or more orientations;

receiving a plurality of number I of patch functions that each is based on a random portion of a sparse transformed image at corresponding orientations for a randomly selected image of a training set of images, wherein the plurality of patch functions represent learned features in the training set; and determining a feature in the subject image based on the transformed subject image and the plurality of patch functions.

23. An apparatus for determining a feature in an image, comprising logic encoded in a tangible medium and configured to:

perform a sparse transform on a subject image, wherein the sparse transform is selected from a group comprising a wavelet transform and a Fourier transform, to determine a sparse transformed subject image that represents the subject image with a few significant coefficients compared to a number of values in the subject image at each of one or more orientations;

receive a plurality of number I of patch functions that each is based on a random portion of a sparse transformed image at corresponding orientations for a randomly selected image of a training set of images, wherein the plurality of patch functions represent learned features in the training set; and determine a feature in the subject image based on the transformed subject image and the plurality of patch functions.

* * * * *